(12) United States Patent
Rouse et al.

(10) Patent No.: US 11,510,401 B2
(45) Date of Patent: Nov. 29, 2022

(54) ROD HOLDING DEVICE AND METHODS OF USE

(71) Applicant: ROD DAWG HOLDINGS LLC., Iron Mountain, MI (US)

(72) Inventors: Brandon David Rouse, Iron Mountain, MI (US); James Francis Brackett, Kingsford, MI (US)

(73) Assignee: Rod Dawg Holding LLC, Iron Mountain, MI (US)

( * ) Notice: Subject to any disclaimer, the term of this patent is extended or adjusted under 35 U.S.C. 154(b) by 70 days.

(21) Appl. No.: 17/175,654

(22) Filed: Feb. 13, 2021

(65) Prior Publication Data

US 2021/0161117 A1    Jun. 3, 2021

Related U.S. Application Data

(63) Continuation-in-part of application No. 16/211,191, filed on Dec. 5, 2018, now abandoned.

(60) Provisional application No. 62/596,798, filed on Dec. 9, 2017.

(51) Int. Cl.
*A01K 97/10*    (2006.01)

(52) U.S. Cl.
CPC .................................. *A01K 97/10* (2013.01)

(58) Field of Classification Search
CPC .. A01K 97/10; B63B 17/00; B63B 2017/0054
USPC ........... 248/512, 515, 516, 513, 514, 299.1, 248/292.14, 538, 536, 539, 291.1, 292.13, 248/122.1, 21, 133, 139; 211/70.8, 60.1, 211/62, 80, 81
See application file for complete search history.

(56) References Cited

U.S. PATENT DOCUMENTS

| | | | | |
|---|---|---|---|---|
| 110,434 A * | 12/1870 | Clarke | .................... | A01K 97/10 248/291.1 |
| 125,690 A * | 4/1872 | Pettibone | ............... | A01K 97/10 248/515 |
| 259,142 A * | 6/1882 | Hart | ....................... | A01K 97/10 248/513 |
| 525,132 A * | 8/1894 | Burke | .................... | A01K 97/10 248/512 |
| 1,035,739 A * | 8/1912 | Raes | ..................... | A01K 97/10 211/1 |
| 1,072,574 A * | 9/1913 | Shaw et al. | ............ | A01K 97/10 248/515 |
| 1,585,490 A * | 5/1926 | Hainsworth | ............ | B25B 5/003 269/65 |

(Continued)

*Primary Examiner* — Kimberly T Wood
(74) *Attorney, Agent, or Firm* — Device Patent LLC

(57) ABSTRACT

A rod holding device comprises an elongate low strut, an elongate pivot strut, a first range plate, and a second range plate. The first range plate is spaced from the second range plate and both plates are fixed to a superior end of the low strut which is positioned between the range plates. A pivot joint provides pivoting motion between the pivot strut and low strut for various storage and operational configurations. A clamp assembly engages the first range plate, second range plate and pivot strut for angular locking between the pivot strut and the low strut. A holder assembly comprising an upper rod holder and a lower rod holder is fixed to the pivot strut for holding rods therein. The rod holding device is releasable from an anchor fixed to a base panel.

16 Claims, 16 Drawing Sheets

(56) References Cited

U.S. PATENT DOCUMENTS

| | | | | |
|---|---|---|---|---|
| 1,799,049 | A * | 3/1931 | Krueger | B43K 23/002 248/302 |
| 2,243,388 | A * | 5/1941 | Magyarosi | A01K 97/10 248/514 |
| 2,506,824 | A * | 5/1950 | Thomas | A01K 97/10 248/291.1 |
| 2,693,660 | A * | 11/1954 | Nebergall | A01K 97/10 248/514 |
| 2,734,708 | A * | 2/1956 | Cohn | H01Q 1/084 248/536 |
| 2,833,367 | A * | 5/1958 | Pool | B60N 2/143 297/344.24 |
| 2,854,147 | A * | 9/1958 | Derr | A01K 97/08 248/513 |
| D185,807 | S * | 8/1959 | Antle | 211/60.1 |
| 4,176,819 | A * | 12/1979 | Lowe | A01K 97/10 248/513 |
| 4,486,968 | A * | 12/1984 | Gould | A01K 97/11 43/21.2 |
| 4,587,921 | A * | 5/1986 | Currey | B63B 29/04 114/253 |
| 4,807,935 | A * | 2/1989 | King | B60N 2/767 248/292.12 |
| 4,852,290 | A * | 8/1989 | Wallace | A01K 97/10 43/17 |
| 4,977,848 | A * | 12/1990 | Currey | B63B 29/04 297/344.22 |
| 5,029,799 | A * | 7/1991 | Bernier | F16M 11/06 248/533 |
| 5,257,700 | A * | 11/1993 | Wallace | A47B 81/005 211/106 |
| 5,320,322 | A * | 6/1994 | Williams | G09F 17/00 248/514 |
| D348,504 | S * | 7/1994 | Dahmen | D22/147 |
| 5,330,084 | A * | 7/1994 | Peters | B60R 9/06 211/171 |
| 5,752,636 | A * | 5/1998 | Manley | B60P 3/40 224/511 |
| 5,971,345 | A * | 10/1999 | Khalaf | H01Q 1/1228 343/890 |
| 6,082,680 | A * | 7/2000 | Woodward | B63B 29/06 248/161 |
| 6,116,183 | A * | 9/2000 | Crow | B63B 29/06 297/344.22 |
| 6,129,371 | A * | 10/2000 | Powell | B60R 9/06 280/491.5 |
| 6,206,387 | B1 * | 3/2001 | Tsai | B62K 15/006 280/14.28 |
| 6,338,465 | B1 * | 1/2002 | Stoner | A01K 97/10 248/156 |
| 6,634,611 | B1 * | 10/2003 | Shih | F16M 13/027 248/339 |
| 7,937,883 | B2 * | 5/2011 | Roemer | A01K 97/08 248/512 |
| 8,286,572 | B1 * | 10/2012 | Picek | A01K 97/10 114/364 |
| 9,193,406 | B2 * | 11/2015 | Kim | B62J 1/08 |
| 10,501,991 | B2 * | 12/2019 | Umlor | E06C 7/48 |
| 2003/0070698 | A1 * | 4/2003 | Wells | A45F 3/44 248/533 |
| 2007/0119089 | A1 * | 5/2007 | Nicholson | A01K 91/08 43/43.12 |
| 2009/0072108 | A1 * | 3/2009 | Oleson | F16M 11/10 248/282.1 |
| 2010/0083557 | A1 * | 4/2010 | Stanton | A01K 91/08 248/512 |
| 2010/0270453 | A1 * | 10/2010 | Chiang | F16M 13/02 248/371 |
| 2011/0260029 | A1 * | 10/2011 | Kost | A45B 11/00 224/533 |
| 2012/0211634 | A1 * | 8/2012 | Yang | H01Q 3/06 248/397 |
| 2012/0234992 | A1 * | 9/2012 | Vanover | H01Q 1/1207 248/201 |
| 2013/0026308 | A1 * | 1/2013 | Walquist | F24S 25/65 248/122.1 |
| 2014/0091190 | A1 * | 4/2014 | Argo | F41B 5/1453 248/397 |

* cited by examiner

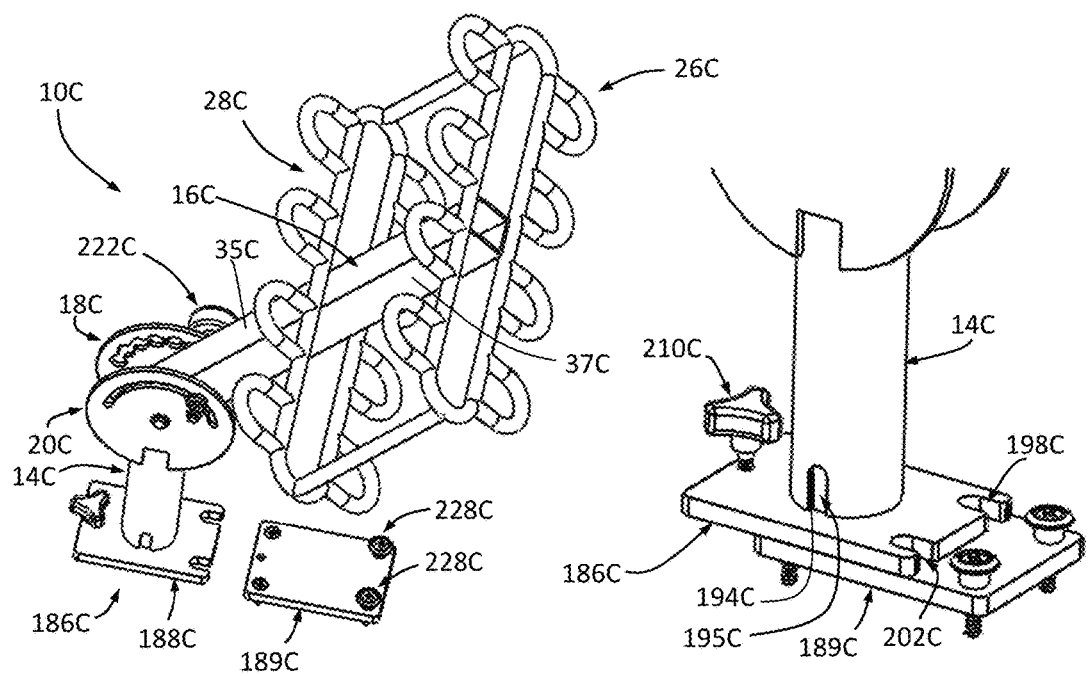
FIGURE 19
FIGURE 20
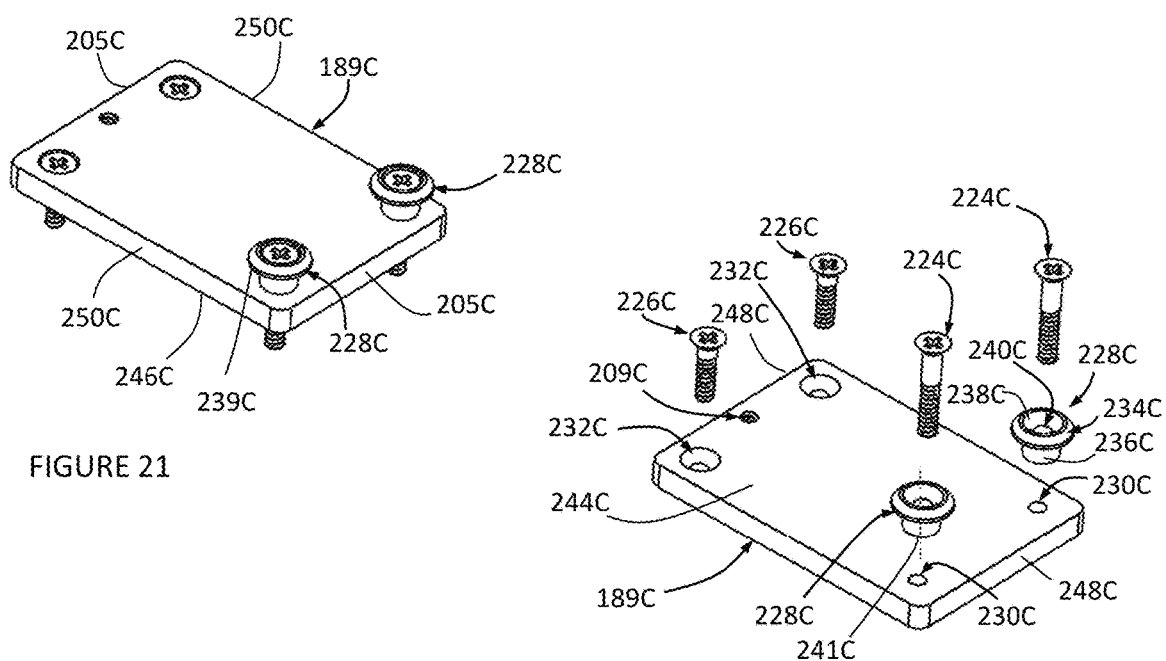
FIGURE 21
FIGURE 22

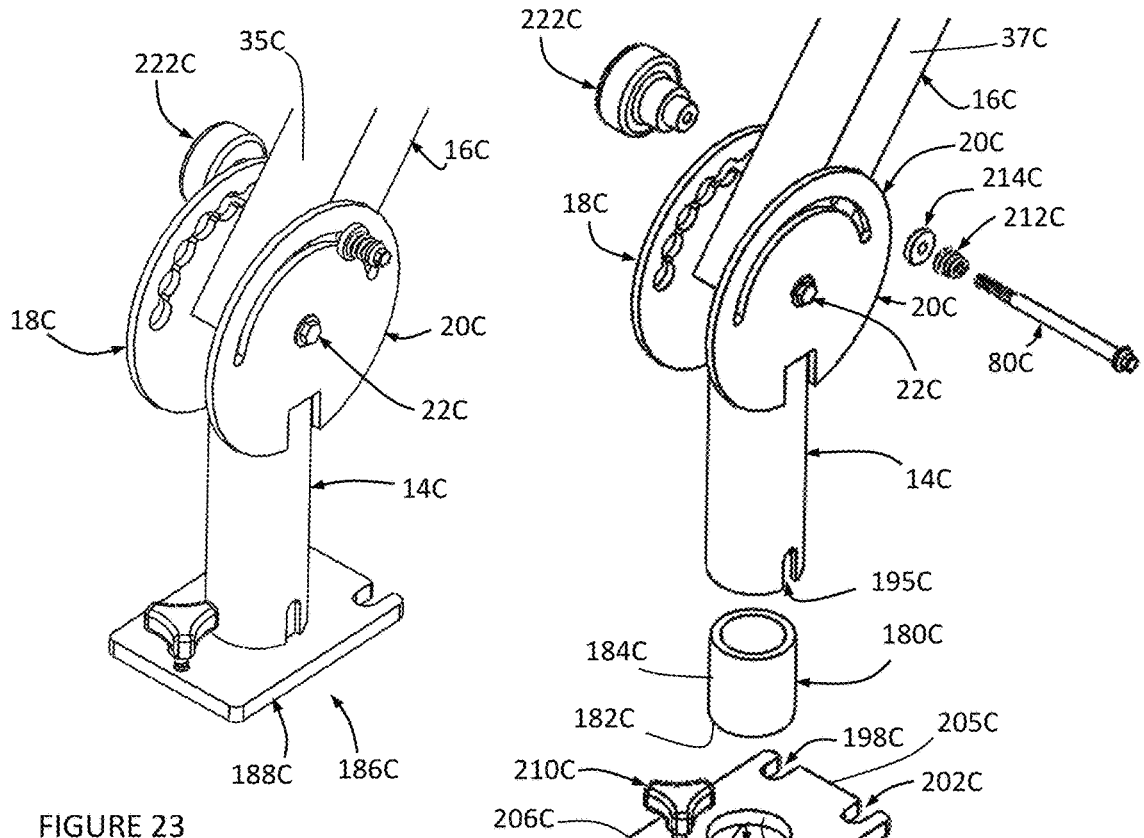
FIGURE 23
FIGURE 24
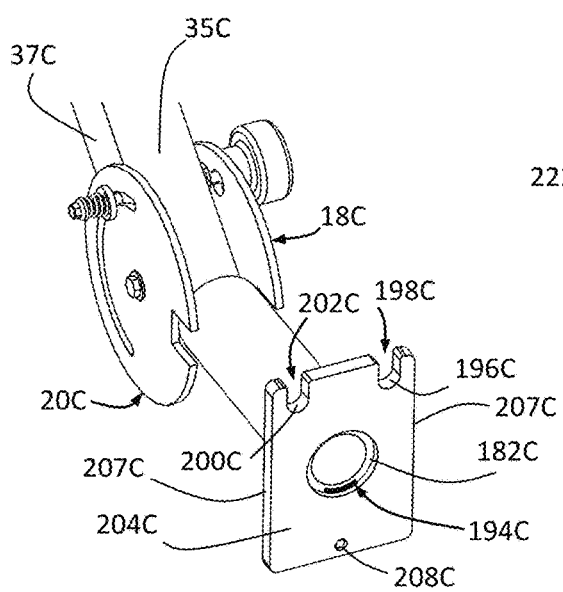
FIGURE 25
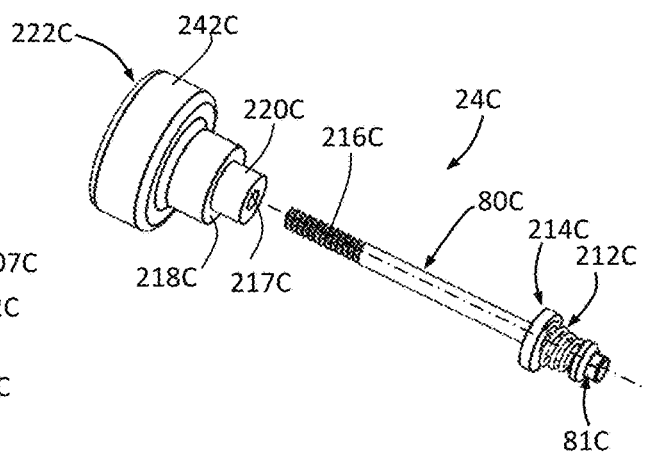
FIGURE 26

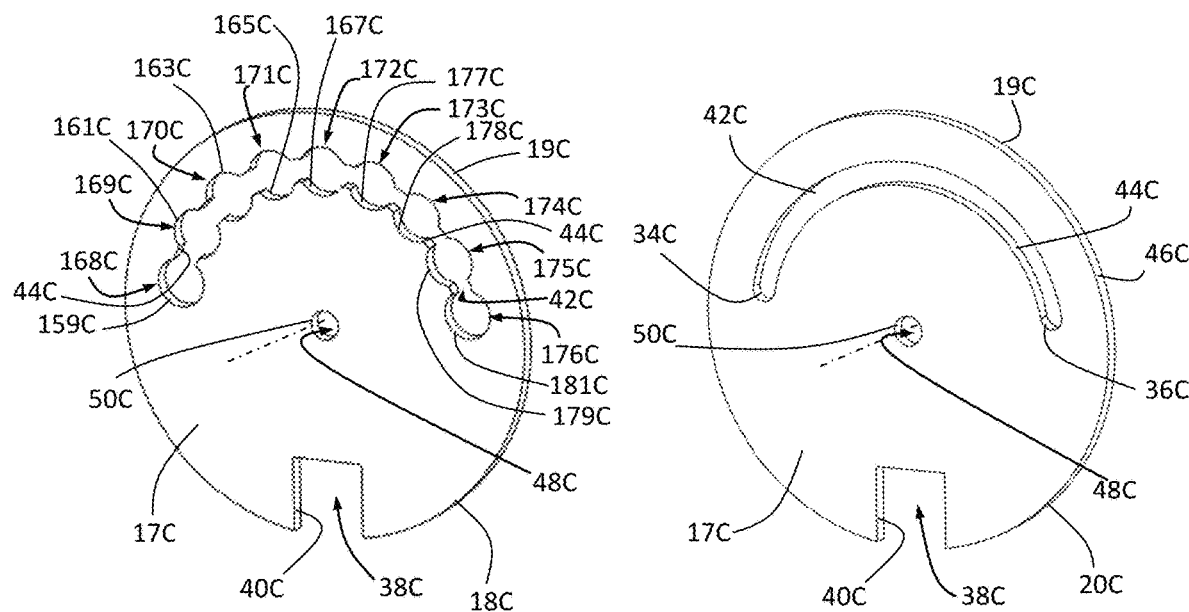
FIGURE 27
FIGURE 28
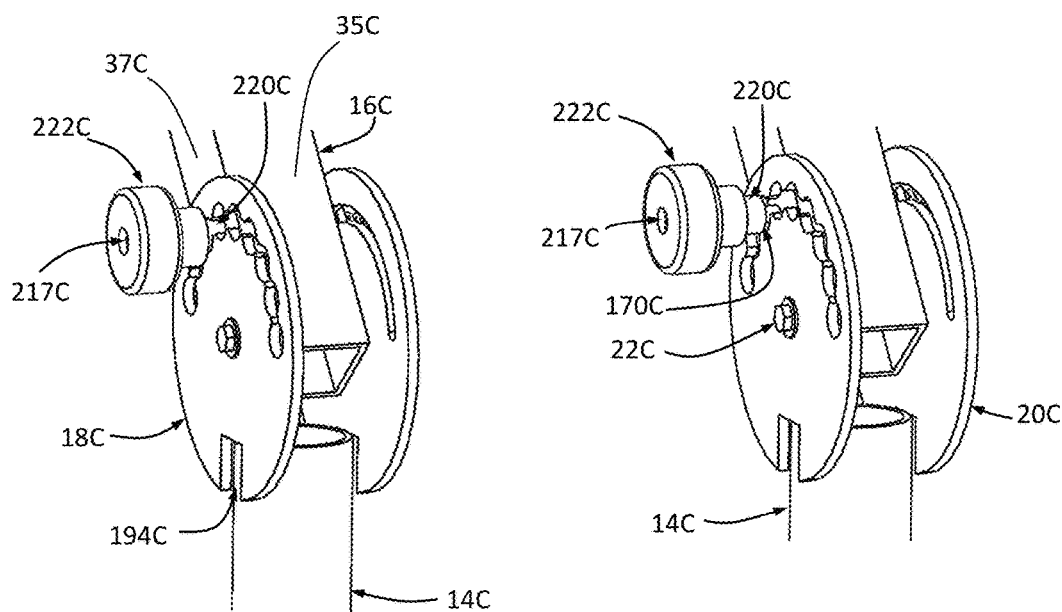
FIGURE 29
FIGURE 30

ROD HOLDING DEVICE AND METHODS OF USE

This Continuation-In-Part patent application claims priority to U.S. Non-Provisional patent application Ser. No. 16/211,191 filed Dec. 8, 2018 which claims priority to Provisional Patent Application No. 62/596,798 filed Dec. 9, 2017, the entire disclosures of which are hereby incorporated by reference and relied upon.

BACKGROUND

Field of the Invention

The invention relates generally to holding devices, and more particularly to adjustable rod holding devices.

Transporting rods such as fishing rods can be challenging due to the length of the rods and the difficulty of holding rods in a bundle. This is due not only to the multiple appendages on the rods such as reels, handles, eyelets, fishing line, hooks, and lures, but also due to unbalanced weight distribution from one end of the rod to another. The length of rods can make storage in a boat or elsewhere very difficult and can be an obstruction and safety hazard for people walking inside a boat. Rods that are not tucked away can easily catch on overhead structures such as electrical lines, branches, and garage door obstructions.

What is needed are rod holding devices that can arrange and hold rods in a compact bundle yet capable to access any one individual rod. What is needed is a rod holding device that is quickly releasable from an anchor point somewhere on a boat so the rods can be easily moved and stored as a convenient bundle. The rod holding device needs to be adjustable to various angles whereby it is substantially upright or tilted upwards when used for fishing in an operational configuration. In addition, the needed rod holding device must be operable to be folded down to prevent catching the rods on any nearby objects either overhead, on sides, or within a given boat in a transport configuration. Lastly, the rod holding device must be quickly and easily removed from the boat in a storage configuration.

SUMMARY

The article of invention is a rod holding device useful for the transport and storage of rods. In preferred embodiments, the article of invention is in the form of a fishing rod holding device.

In one form, a fishing rod holding device comprises a low strut releasably fixed to an anchor at an inferior end.

In one form, the low strut is in the form of an elongate cylindrical tube.

In one form, the low strut is generally vertical.

In one form, the low strut comprises a transition interface fixed to an inferior end for releasable coupling with an anchor.

In one form, an anchor supporting a low strut is secured to a base panel of a boat.

In one form, a boat seat comprising a transition interface is substituted with a rod holding device for fixation in an anchor fixed to a base panel of a boat.

In one form, a pivot strut is pivotably coupled to a superior end of the low strut.

In one form, a pivot strut is in the form of an elongate square or rectangular tube.

In one form, a first range plate is fixed to at least one of a low strut and a pivot strut.

In one form, a first range plate is spaced from a second range plate and are fixed to at least one of a low strut and a pivot strut.

In one form, one or more of a first range plate and a second range plate are fixed by welds to at least one of a low strut and a pivot strut.

In one form, a range plate is generally flat with a generally circular profile defined by a perimeter face.

In one form, a range plate comprises a generally arcing clamp channel defined by a channel face inset from a perimeter face and wherein the channel face extends between an outer range face and an inner range face.

In one form, the clamp channel extends through an arc greater than 90 degrees.

In one form, the clamp channel extends through an arc of at least 120 degrees.

In one form, the clamp channel extends through an arc of about 160 degrees.

In one form, the clamp channel extends through an arc of more than 180 degrees.

In one form, an arcing clamp channel extending between an outer range face and an inner range face terminates in a first stop surface and a second stop surface at opposed ends of the clamp channel.

In one form, an alignment notch extends inward from the perimeter face of a range plate between a first stop surface and second stop surface for seating of a portion of one or more of a low strut and a pivot strut.

In one form, an alignment notch of a range plate is defined by a notch face.

In one form, an alignment notch of a range plate is generally square or rectangular in profile.

In one form, a range plate comprises a generally centralized pivot aperture defined by a pivot face which extends between an outer range face and an inner range face for housing a pivot bolt.

In one form, a weight aperture is positioned medial to a clamp channel and extends between an outer range face and an inner range face for weight reduction.

In one form, one or more of a first range plate and a second range plate are fixed to a strut surface at a superior end of a low strut.

In one form, one or more of a first range plate and a second range plate are fixed at an alignment notch to a strut surface of a low strut using a weld.

In one form, a pivot strut comprises a pivot hole at an inferior end for housing a pivot assembly to serve as a pivot axis.

In one form, a pivot hole on a pivot strut is aligned with a pivot aperture on a range plate for controlled pivoting motion therebetween using a pivot assembly.

In one form, a pivot strut comprises a clamp hole spaced from an inferior end for housing a clamp assembly for holding a desired angulation between a pivot strut and low strut.

In one form, a clamp hole on a pivot strut is aligned with a clamp channel on a range plate for pivotal clamping therebetween using a clamp assembly.

In one form, a pivot assembly comprises a pivot spacer, a pivot bolt, a pivot nut, a first pivot washer, and a second pivot washer.

In one form, a clamp assembly comprises a lock spacer, a clamp shaft, a first inner clamp washer, a second inner clamp washer, a first outer clamp washer, a second outer clamp washer, a first clamp knob and a second clamp knob.

In one form, a first clamp knob is fixed to a clamp shaft.

In one form, a second clamp knob threadably engages a clamp shaft.

In one form, a first clamp knob and a second clamp knob threadably engage a clamp shaft.

In one form, a clamp shaft comprises an enlarged clamp head.

In one form, the clamp head comprises drive faces.

In one form, a holder assembly comprises an upper rod holder and a lower rod holder.

In one form, a holder assembly comprises an upper rod holder, a lower rod holder, and one or more of a first holder stabilizer and a second holder stabilizer extending between the upper rod holder and lower rod holder.

In one form, a portion of a holder assembly is fixed to a distal end portion of a pivot strut.

In one form, a portion of a holder assembly is fixed to a distal end portion of a pivot strut using one or more of welds and fasteners.

In one form, an upper rod holder comprises an upper rod collar.

In one form, an upper rod collar is generally oval having a generally oval first central aperture.

In one form, a lower rod collar is generally oval having a generally oval second central aperture.

In one form, one or more of the first central aperture and second central aperture are sized to house a pivot strut therein.

In one form, an upper rod collar and a lower rod collar are fixed on a pivot strut in planes generally perpendicular to a pivot strut.

In one form, spaced radially from said upper rod collar and said lower rod collar are a plurality of cages.

In one form, said plurality of cages extending from the upper rod collar generally reside in a common plane with the upper rod collar.

In one form, said plurality of cages extending from the lower rod collar generally reside in a common plane with the lower rod collar.

In one form, an upper cage defines an upper rod tunnel for containing a portion of a rod therein.

In one form, a lower cage defines a lower rod tunnel for containing a portion of a rod therein.

In one form, individual upper cages are generally aligned with individual lower cages such that a rod can be captured therein along aligned axes.

In one form, a holder assembly is fixed to a distal end of a pivot strut.

In one form, a holder assembly is fixed to a distal end of a pivot strut using welds.

In one form, a pivot strut is moveable through a range of motion thereby positioning rods held within a holder assembly in a plurality of angular positions.

In one form, a clamp shaft portion of a clamp assembly travels within a clamp channel of a range plate wherein said assembly may be locked at any position within the clamp channel.

In one form, a clamp shaft portion of a clamp assembly travels within a clamp channel of a range plate wherein said assembly may be locked predefined positions within the clamp channel.

In one form, a clamp shaft spans across a pair of spaced range plates.

In one form, a pivot range of a pivot strut is limited by interference between a portion of a clamp assembly and one or more of a first stop surface and a second stop surface within a range plate clamp channel.

In one form, a clamp assembly is locked by advancing one or more of a first clamp knob and a second clamp knob causing a frictional locking between the clamp assembly and corresponding range plate in a locked configuration.

In one form, a clamp assembly is unlocked by reversing advancement of one or more of a first clamp knob and a second clamp knob causing a reduction of frictional locking between the clamp assembly and corresponding range plate in an unlocked configuration.

In one form, a user places a fishing rod holding device in an unlocked configuration and adjusts a corresponding pivot strut to a new predetermined position then changes the corresponding clamp assembly to a locked configuration.

In one form, a clamp assembly is in the form of a cammed quick release rod and skewer.

In one form, a cammed quick release rod and skewer comprises a cam pad on which a cam lobe from a cam lever articulates.

In one form, a cam shaft is positioned generally perpendicular to a clamp shaft of a cammed quick release rod and skewer.

In one form, a clamp assembly is locked by pivoting a cam lever causing a frictional locking between the clamp assembly and corresponding range plate in a locked configuration.

In one form, a clamp assembly is unlocked by reversing pivoting of a cam lever causing a frictional unlocking between the clamp assembly and corresponding range plate in an unlocked configuration.

In one form, one or more of a first range plate and a second range plate comprises a plurality of recess surfaces inset from an outer range face.

In one form, the recess surfaces are radially centered and spaced about a clamp channel.

In one form, a lock face extends between the recess surfaces and the outer range face.

In one form, lock pockets are formed in an outer range face of a range plate and are defined by a recess surface and a lock face.

In one form, a lock pocket is sized and shaped to seat an outer clamp washer.

In one form, and in a locked configuration, an outer clamp washer abuts a lock face to prevent pivoting movement of a range plate from a predesignated position.

In one form, and in an unlocked configuration, an outer clamp washer is able to move past a lock face on the range plate to provide for pivoting adjustment of a holder assembly to a predesignated position.

In one form, a fishing rod holding device comprises a transition interface at a proximal end of a low strut.

In one form, a transition interface is in the form of an interface cup. The interface cup comprises an inner cup face having a size and profile for seating a proximal end of a low strut therein.

In one form, an interface cup comprises an outer cup face having a size and profile suited for seating within an anchor.

In one form, a boat seat comprising a transition interface is substituted with a rod holding device for fixation in an anchor fixed to a base panel of a boat.

In one form, an interface cup comprises a high position boss for seating within a complementing high notch of an anchor thus preventing rotation therebetween.

In one form, an interface cup comprises a low position boss extending inferiorly for seating within a complementing low socket of an anchor.

In one form, an interface cup comprises a lever lock for releasably securing an interface cup within an anchor.

In one form, a base comprises a cup holder portion sized and shaped for seating a corresponding transition interface therein.

In one form, an anchor has a broad base having screw holes at its periphery.

In one form, a broad base is secured to a base panel using one or more base screws.

In one form, a base panel is the floor of a boat.

In one form, a base panel is on the rail of a boat.

In one form, a base panel is a horizontal surface elevated from the floor of a boat.

In one form, when a fishing rod holding device is removed from an anchor, the anchor may be used to support a seat.

In one form, a fishing rod holding device holds a plurality of fishing poles.

In one form, a fishing rod holding device is removed from an anchor for storage.

In one form, a fishing rod holding device with one or more fishing rods seated within an upper rod tunnel and lower rod tunnel is removed from an anchor for storage as a combined fishing rod and fishing rod holding device unit.

In one form, a lever lock is depressed to release a transition interface from an anchor.

In one form, a clamp assembly is in the form of a clamp shaft that is biased in one direction.

In one form, a clamp assembly comprises an engagement knob mounted on one end.

In one form, a clamp assembly comprises an engagement spring for biasing a clamp shaft in one direction.

In one form, an engagement knob comprises a radially positioned engagement face sized to engage a lock pocket on range plate.

In one form, an engagement knob comprises at least one grasp face for grasping by a user's hand.

In one form, an engagement knob comprises a stop face for engagement with an outer range face of a range plate.

In one form, distracting an engagement knob against engagement spring force unlocks an engagement face from a lock pocket providing consequent angle adjustment of a pivot strut relative to a low strut.

In one form, a clamp shaft is pivotable through a clamp channel for adjustment of a pivot strut angle.

In one form, a range plate comprises a series of lock faces forming lock pockets along the length of a clamp channel.

In one form, the lock faces are sized and shaped to seat an engagement face of an engagement knob therein.

In one form, a first range plate comprising a series of lock pockets along a clamp channel is paired with a second range plate absent of lock pockets along a clamp channel.

In one form, a low strut terminates in a releasable foot configured for releasable fixation to an anchor plate.

In one form, the releasable foot comprises a foot plate fixed to the low strut.

In one form, one or more welds join a low strut to a foot plate.

In one form, a base strut reinforces the junction between the low strut and foot plate.

In one form, the base strut is in the form of a tube.

In one form, the base strut resides within the low strut.

In one form, the low strut comprises at least one weld notch at an inferior end for joining the low strut with the base strut using a weld.

In one form, a base strut is seated in a ring aperture extending through the foot plate between a foot bottom and foot top.

In one form, a foot plate comprises an opposing first slot and second slot extending between a foot bottom and foot top from a foot end face of the foot plate.

In one form, an upper lock aperture for housing a lock bolt extends from a foot top to a foot bottom of a foot plate.

In one form, a lock bolt is housed in an upper lock aperture.

In one form, an anchor plate is configured for releasable locking with a foot plate.

In one form, an anchor plate comprises opposed anchor end surfaces.

In one form, an anchor plate comprises opposed anchor side surfaces.

In one form, an anchor plate comprises opposed first plate holes extending between an anchor top surface and anchor bottom surface at one end of the anchor plate.

In one form, an anchor plate comprises opposed second plate holes extending between an anchor top surface and anchor bottom surface of the anchor plate.

In one form, the first plate holes and second plate holes are positioned at opposed ends of the anchor plate.

In one form, at least one of the first plate holes and second plate holes are counter sunk or counter bored for seating of the head of a plate fastener therein.

In one form, lock collar is configured for seating within one or more of a first slot and second slot of a foot plate to provide releasable fixation at one end of the foot plate.

In one form, the lock collar comprises a toe wall sized to fit within one for more of a first slot and second slot of a foot plate.

In one form, the lock collar comprises a bottom collar face for seating against an anchor top surface.

In one form, the lock collar comprises a radially enlarged rim spaced from the bottom collar face.

In one form, the radially enlarged rim comprises a rim face for engaging the foot top of a foot plate when the lock collar is seated within a first slot or second slot.

In one form, the lock collar comprises a collar aperture extending through the lock collar along a central axis.

In one form, the lock collar comprises a countersunk or counter bored head recess for seating the head of a plate fastener therein.

In one form, the anchor plate comprises a lower lock aperture extending between an anchor top surface and an anchor bottom surface of an anchor plate.

In one form, the lower lock aperture is threaded to complement the lock bolt.

In one form, the upper lock aperture and lower lock aperture are aligned when the releasable foot is mated with the anchor plate.

In one form, a first foot plate fastener extends through the collar aperture of a lock collar and through a first plate hole of an anchor plate then seated in a panel of a boat.

In one form, a second foot plate fastener extends through a second plate hole of an anchor plate then seated in a base panel of a boat.

In one form, the head of a second foot plate fastener is seated in a counter sunk or counter bored portion of a second plate hole.

In one form, the low strut stands generally vertical in an operational configuration where the rod holding device is anchored to a base panel of a boat or other vehicle.

In one form, the rod holding device is released from an anchor secured to a base panel of a boat or other vehicle in a storage configuration.

In one form, a rod holding device is made substantially from non-corrosive materials such as non-corrosive metals and polymers.

DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein:

FIG. 19 depicts a high perspective view of a rod holding device having a transition interface in the form of a releasable foot and anchor plate system and a spring loaded clamp assembly;

FIG. 20 depicts a partial perspective view of the releasable foot and anchor plate system of FIG. 19;

FIG. 21 depicts a perspective view of the anchor plate assembly of FIG. 19;

FIG. 22 depicts an exploded perspective view of the anchor plate assembly of FIG. 19;

FIG. 23 depicts a partial perspective view of the spring loaded clamp assembly and releasable foot of the rod holding device of FIG. 19;

FIG. 24 depicts an exploded partial perspective view of the spring loaded clamp assembly and releasable foot of the rod holding device of FIG. 19;

FIG. 25 depicts a partial bottom perspective view of a weld joining the releasable foot and base strut;

FIG. 26 is a perspective view of the spring loaded clamp assembly of FIG. 23;

FIG. 27 is a perspective view of a first range plate used with a spring loaded clamp assembly;

FIG. 28 is a perspective view of a second range plate used with a spring loaded clamp assembly;

FIG. 29 is a partial perspective view of a spring loaded clamp assembly in a locked configuration;

FIG. 30 is a partial perspective view of a spring loaded clamp assembly in an unlocked positon.

DETAILED DESCRIPTION OF SELECTED EMBODIMENTS OF THE INVENTION

Select embodiments of the invention will now be described with reference to the Figures. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. Like numerals indicate like or corresponding elements throughout the several views and wherein various embodiments are separated by letters (i.e. 100, 100B, 100C).

Figure 34:
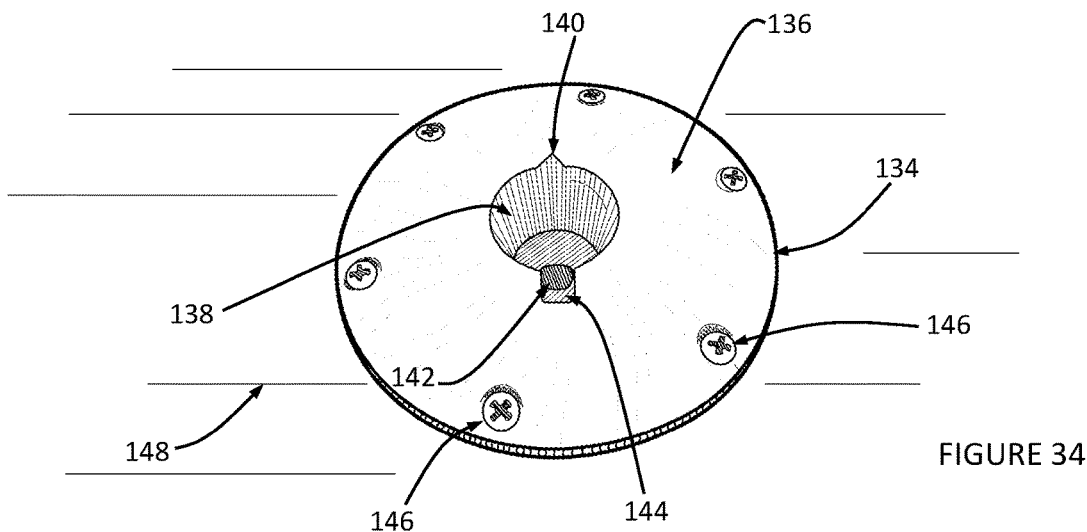
FIG. 34 is a perspective view illustrating one form of anchor common in the prior art for releasably securing a post to a floor.

In one embodiment, FIGS. 1-6 depict an embodiment of a fishing rod holding device 10 comprising a low strut 14 releasably fixable to an anchor 134 at an inferior end. The low strut 14 in this embodiment is in the form of an elongate tube and comprises a transition interface 12 fixed to an inferior end of low strut 14 for releasable coupling with an anchor 134 (FIG. 34). A pivot strut 16 is pivotably coupled to the low strut 14.

Figure 8:
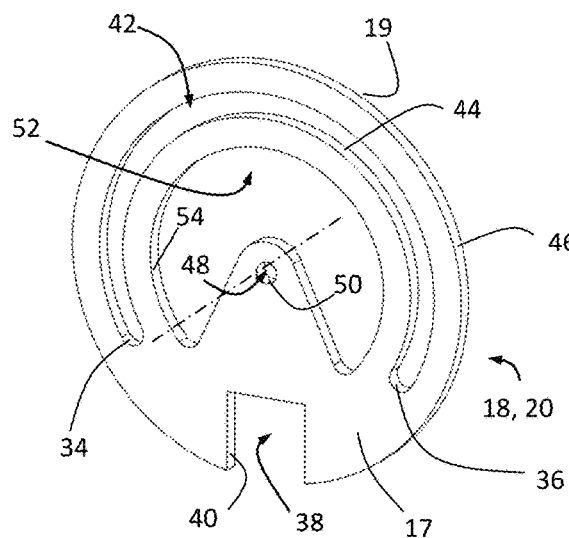
FIG. 8 depicts a perspective view of a range plate utilized on the rod holding device of FIG. 1.
Figure 9:
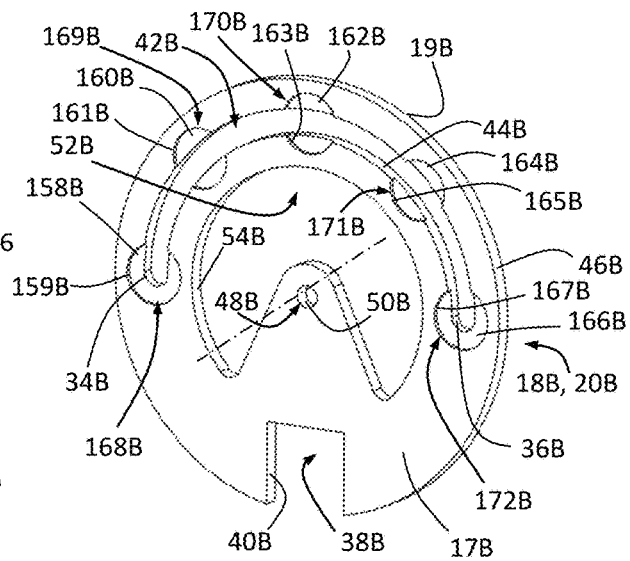
FIG. 9 depicts a perspective view of a range plate utilized on the rod holding device of FIG. 7.

In this embodiment, a first range plate 18 is fixed to low strut 14 at strut surface 15. First range plate 18 is spaced from a second range plate 20 with each fixed to low strut 14 by welds although fasteners are used in other embodiments. A first range plate 18 and a second range plate 20 are generally flat with a generally circular profile defined by perimeter face 46 (FIG. 8). One skilled in the art will recognize profiles besides circular may be used. Each range plate comprises an arcing clamp channel 42 defined by a channel face 44 inset from a perimeter face 46 and extending between an outer range face 17 and an inner range face 19. Arcing clamp channel 42 extending between an outer range face 17 and inner range face 19 terminates in a first stop surface 34 and a second stop surface 36. An alignment notch 38 extends inward from perimeter face 46 of a range plate between a first stop surface 34 and second stop surface 36 for seating of a portion of a low strut 14 therein. Alignment notch 38 is defined by a notch face 40. Here, alignment notch 38 is generally rectangular in profile. Each of first range plate 18 and second range plate 20 comprises a generally centralized pivot aperture 48 defined by a pivot face 50 extending between outer range face 17 and an inner range face 19 for housing a pivot bolt 62.

Figure 6:
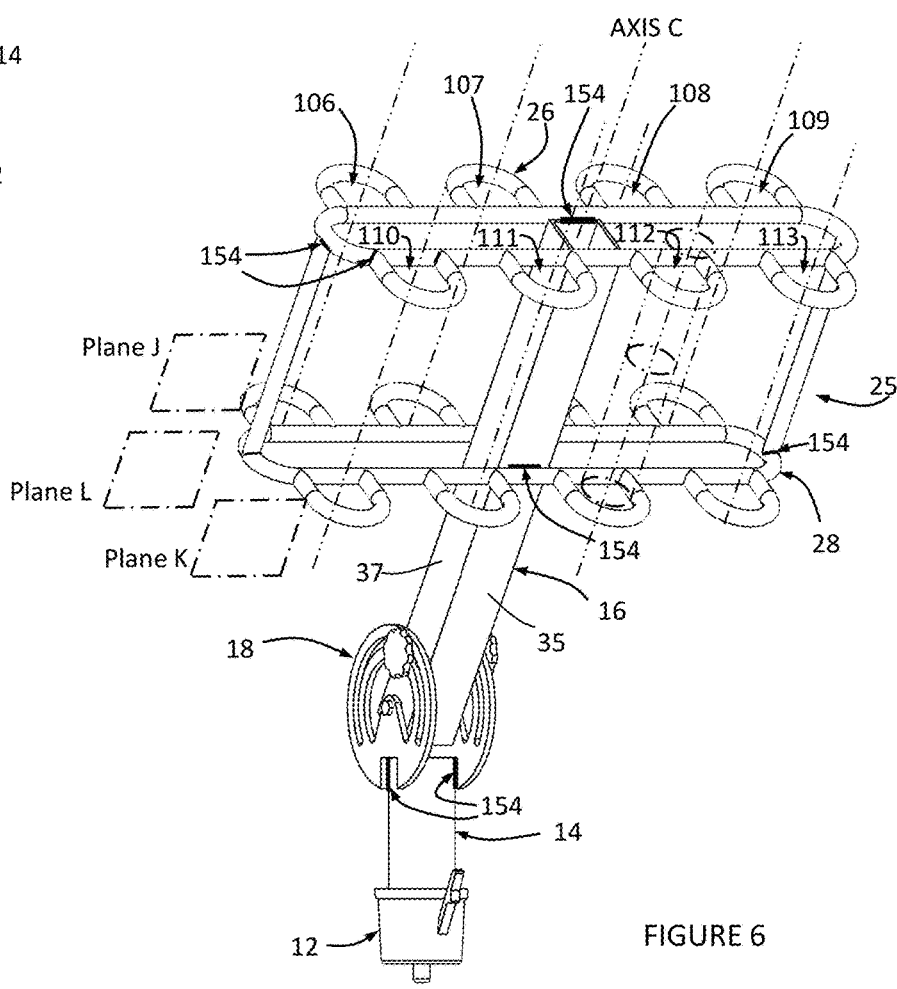
FIG. 6 depicts a perspective view of the rod holding device of FIG. 3 illustrating an alignment between upper cages and lower cages in which rods are captured.

In this embodiment, a weight aperture 52 defined by weight face 54 (FIG. 8) is positioned medial to clamp channel 42 and extends between outer range face 17 and inner range face 19 for weight reduction however the weight aperture may be absent in some embodiments. One or more of first range plate 18 and second range plate 20 are fixed at alignment notch 38 to strut surface 15 at a superior end of low strut 14 by weld 154 (FIG. 6).

Figure 2:
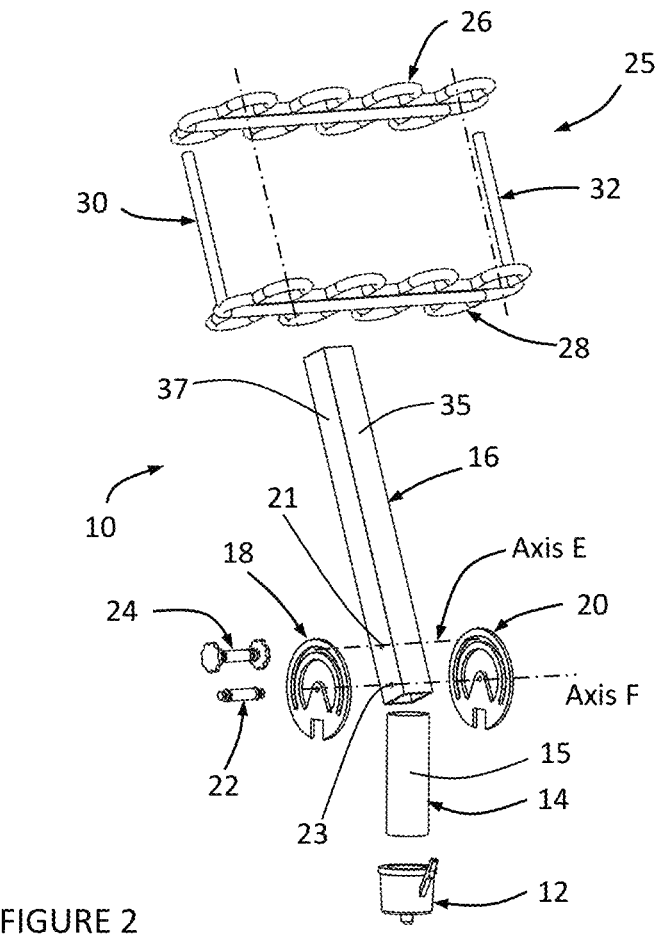
FIG. 2 depicts an exploded perspective view of the rod holding device of FIG. 1.

As illustrated in FIG. 2, a pivot strut 16 comprises a pivot hole 23 extending through opposed lateral faces 37 and extending along Axis F at an inferior end of the pivot strut for housing a pivot assembly 22. The pivot hole 23 on pivot strut 16 is aligned with pivot aperture 48 on a range plate for controlled pivoting motion therebetween using a pivot assembly 22.

Pivot strut 16 comprises a clamp hole 21 extending through opposed lateral faces 37 and extending along Axis E and spaced from an inferior end for housing a clamp assembly 24 therein. Clamp hole 21 extends perpendicular through pivot strut 16 and is aligned with a clamp channel 42 on a range plate for pivotal clamping therebetween using a clamp assembly 24. In this embodiment, pivot strut 16 is defined by opposed pivot strut faces 35 that face the pivotal path of pivot strut 16.

Figure 10:
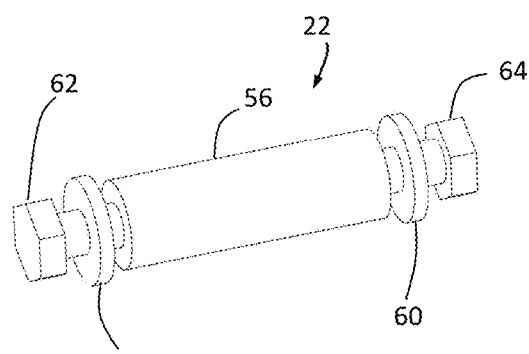
FIG. 10 depicts a perspective view of a pivot assembly.

Pivot assembly 22 (FIG. 10) comprises a pivot spacer 56, a pivot bolt 62, a pivot nut 64, a first pivot washer 58, and a second pivot washer 60. In some embodiments, a bushing, such as a bronze bushing may be utilized to reduce wear between pivot bolt 62 and pivot strut 16.

Figure 11:
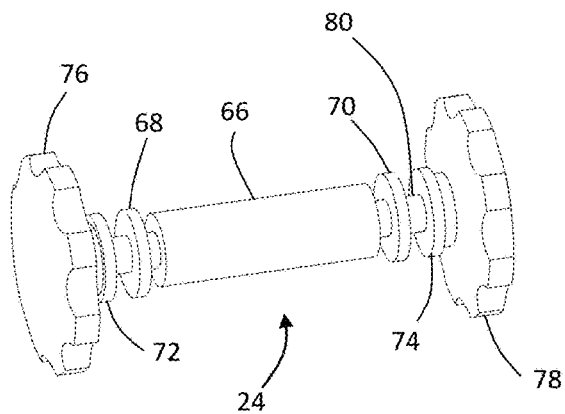
FIG. 11 depicts a perspective view of a clamp assembly.

One embodiment of a clamp assembly 24 (FIG. 11) comprises; a lock spacer 66, a clamp shaft 80, a first inner clamp washer 68, a second inner clamp washer 70, a first outer clamp washer 72, and a second outer clamp washer 74. In this embodiment, first clamp knob 76 is fixed to clamp shaft 80, whereas second clamp knob 78 threadably engages clamp shaft 80. In other embodiments, first clamp knob 76 and second clamp knob 78 both threadably engage clamp shaft 80. Advancing either or both first clamp knob 76 and second clamp knob 78 causes a frictional compression that clamps the pivot strut 16 in a desired position.

Holder assembly 25 (FIG. 1-2) comprises an upper rod holder 26 and a lower rod holder 28 and one or more of a first holder stabilizer 30 and a second holder stabilizer 32 extending between the upper rod holder 26 and lower rod holder 28. The holder stabilizers are positioned at a midpoint of the short leg of the upper rod holder and lower rod holder. A portion of holder assembly 25 is fixed to a distal end portion of pivot strut 16 using one or more of welds and fasteners. In preferred embodiments, the holder assembly 25 is constructed of substantially bent rod or tubing welded together but may be constructed using other techniques known in the art such as casting.

Figure 14:
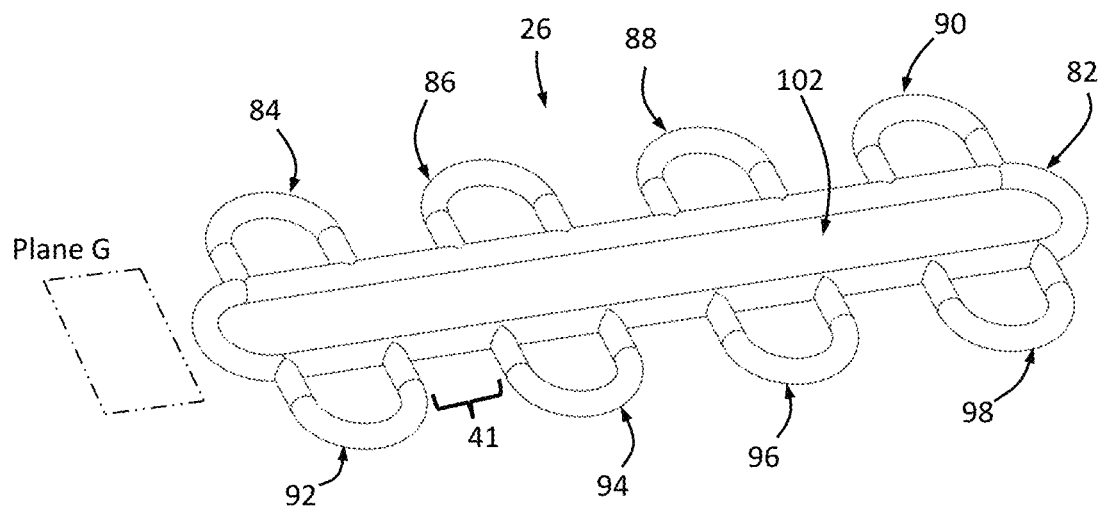
FIG. 14 depicts a perspective view of an upper rod holder.
Figure 15:
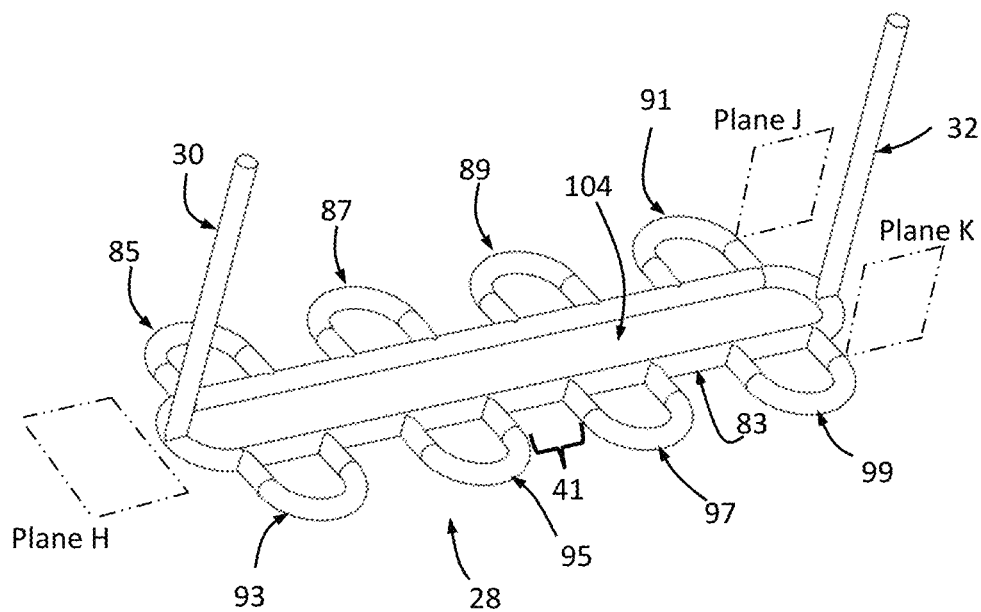
FIG. 15 depicts a perspective view of a lower rod holder.
Figure 16:
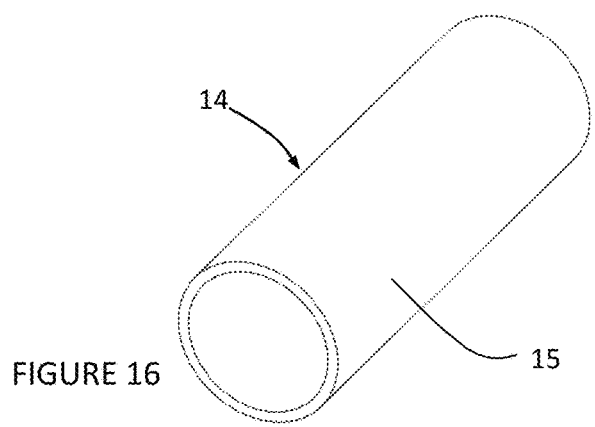
FIG. 16 depicts a perspective view of a low strut.

As illustrated in FIG. 14-15, upper rod holder 26 comprises an upper rod collar 82 which in this embodiment is substantially stadium shaped or otherwise described as a rounded rectangle, obround, oval, or oblong. The upper rod holder 26 has a substantially obround first central aperture 102 having a width suited for housing the pivot strut 16 therebetween the opposed long sides of the aperture. Lower rod collar 83 is substantially a duplicate of the upper rod collar 82. One or more of first central aperture 102 and second central aperture 104 are sized to house a pivot strut 16 therein whereby the upper rod collar and lower rod collar are fixed by welds or fasteners substantially perpendicular to the pivot strut preferably at a location central along the long sides of the rod collars. Spaced radially from the upper rod collar 82 and said lower rod collar 83 are a plurality of cages illustrated as cages 84-99. Cages 84, 86, 88, 90, 92, 94, 96, 98 extend from upper rod collar 82 and generally reside in a common plane G with upper rod collar 82. Cages 85, 87, 89, 91, 93, 95, 97, 99 extend from lower rod collar 83 and generally reside in a common plane H with lower rod collar 83. In preferred embodiments, the cages are in the form of U-shaped bars or tubes with ends welded to the respective upper rod collar 82 and lower rod collar 83. In this embodiment, the cages are linearly fixed along the long sides of the respective lower rod collar or upper rod collar with a cage gap 41 separating the respective cages.

In this embodiment (FIGS. 6, 7, 19), individual upper cages 84-98 (even) are generally aligned with a respective lower cage 85-99 (odd) which define the rod tunnels. Note for example (FIG. 6), the cylindrical shaped dotted outline representing seventh rod tunnel 112 extending between the seventh upper cage 96 and seventh lower cage 97. The other rod tunnels are not illustrated for clarity, but similarly, first rod tunnel 106 extends between first upper cage 84 and first lower cage 85, second rod tunnel 107 extends between second upper cage 86 and second lower cage 87, third rod tunnel 108 extends between third upper cage 88 and third lower cage 89, fourth rod tunnel 109 extends between fourth upper cage 90 and fourth lower cage 91, fifth rod tunnel 110 extends between fifth upper cage 92 and fifth lower cage 93, sixth rod tunnel 111 extends between sixth upper cage 94 and sixth lower cage 95, and eighth rod tunnel 113 extends between eighth upper cage 98 and eighth lower cage 99, as illustrated in FIG. 6 such that rods 150 can be captured therein. Note that the first rod tunnel 106, second rod tunnel 107, third rod tunnel 108, and fourth rod tunnel 109 are aligned in plane J. Similarly, fifth rod tunnel 110, sixth rod tunnel 111, seventh rod tunnel 112, and eighth rod tunnel 113 are aligned in plane K. Plane L is central to pivot strut 16 whereas plane J is spaced from plane L on one side, and plane K is spaced from plane L on the other side. This spacing from central plane L of rod tunnels 106-109 on one side and rod tunnels 110-113 on the other side minimizes obstruction between rods during movement of fishing rods in and out of the rod tunnels. In these examples the rod tunnels are aligned to be substantially parallel to the pivot strut in a parallel configuration. In addition, since the fishing rods are held in a plane spaced from the pivot strut 16, the rods therefore can be utilized in a splayed configuration in an operational configuration such as would be used during fishing as noted in FIG. 33 where the fishing rods 150 are placed in a rod tunnel that extends diagonally between upper and lower rod cages which in this case is between fifth upper cage 92 and sixth lower cage 95, and eighth upper cage 98 and seventh lower cage 97. This diagonal arrangement is noted also by the dotted lines in FIG. 7. Note further in FIG. 33 how the spacing of planes J and K away from the pivot strut 16, provide for the proximal ends of the fishing rods 150 to drop through the respective rod cage and extend in front of either of the opposed pivot strut faces 35 without abutting the opposed lateral faces 37 of the pivot strut thereby adding stability to the fishing rods in the rod tunnels in the diagonal arrangement as they can drop down fully against the upper rod holder and fully through the lower rod holder. The collar gap 39 between the upper rod collar and lower rod collar is sufficient to allow angulation and seating of fishing poles through diagonally arranged rod tunnels.

Figure 3:
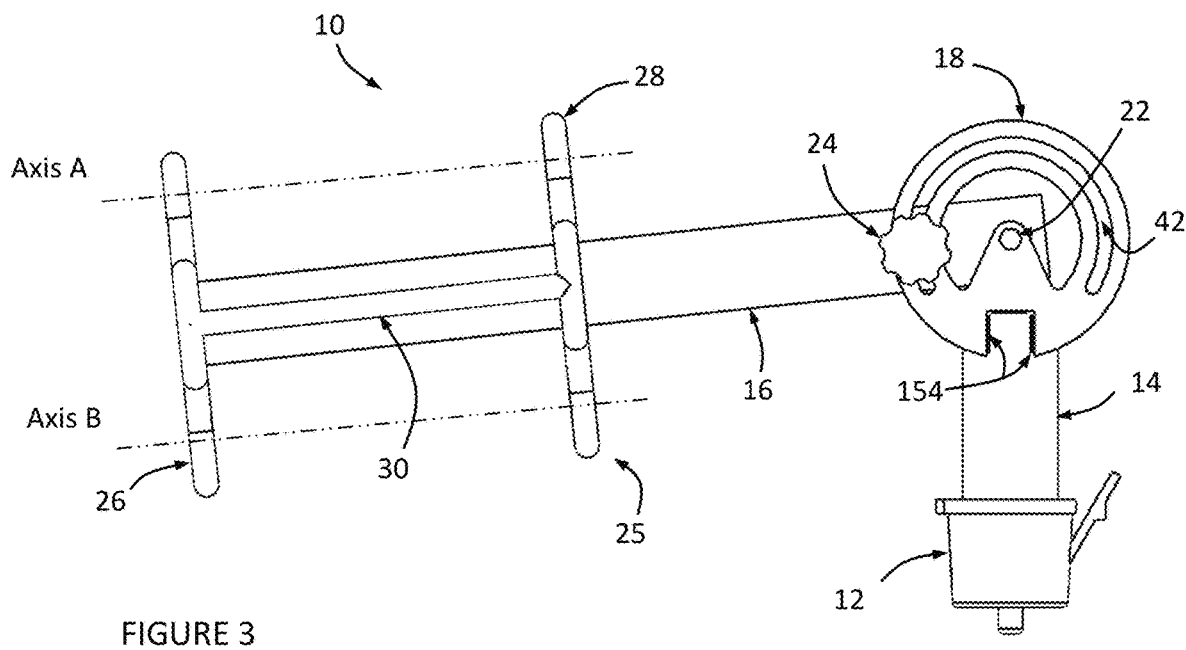
FIG. 3 depicts a side view of a rod holding device illustrating a tilted holder assembly positioned in one direction.

This alignment between cages is also illustrated in FIG. 3 as Axis A and Axis B show alignment between rod tunnels of cages of upper rod holder 26 and lower rod holder 28. In some embodiments, the reel of a fishing rod is larger than the size of a corresponding upper rod tunnel (i.e. first upper rod tunnel 106) and therefore serves as a reel stop to keep the rod and reel positioned within holder assembly 25.

Figure 1:
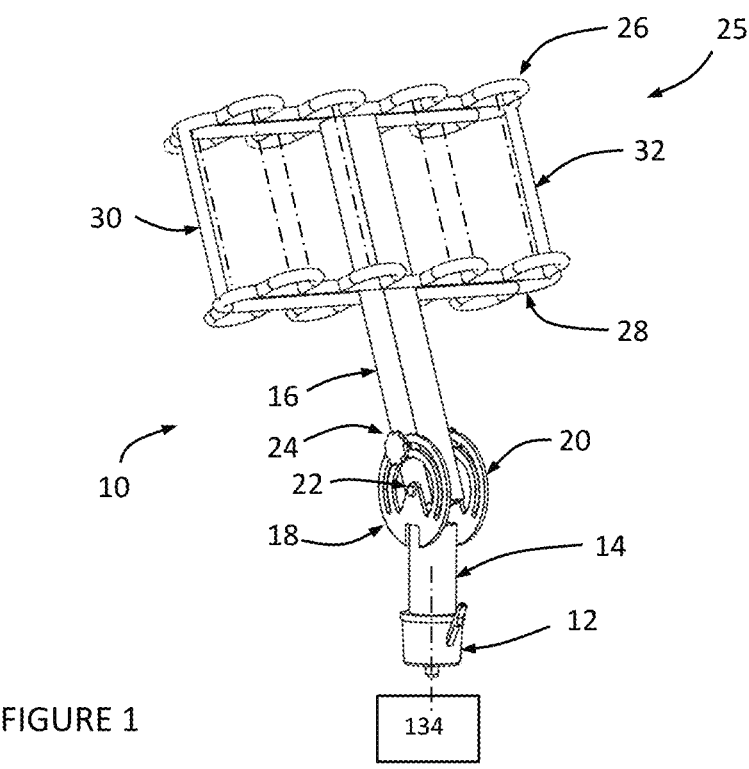
FIG. 1 depicts a perspective view of a rod holding device.
Figure 4:
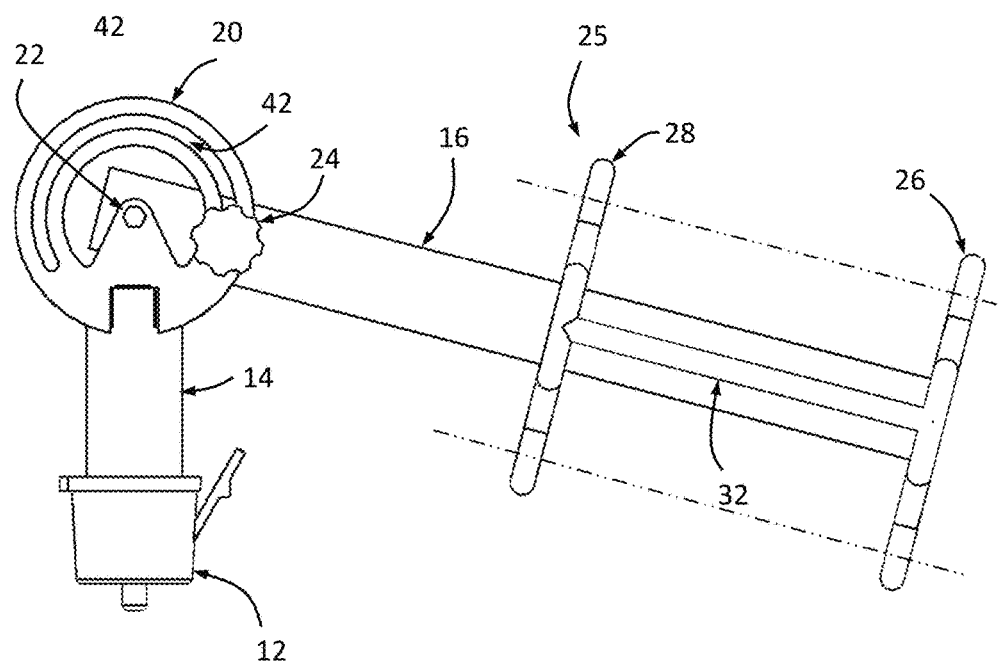
FIG. 4 depicts a side view of the rod holding device of FIG. 3 with tilted holder assembly positioned in an opposed direction.
Figure 5:
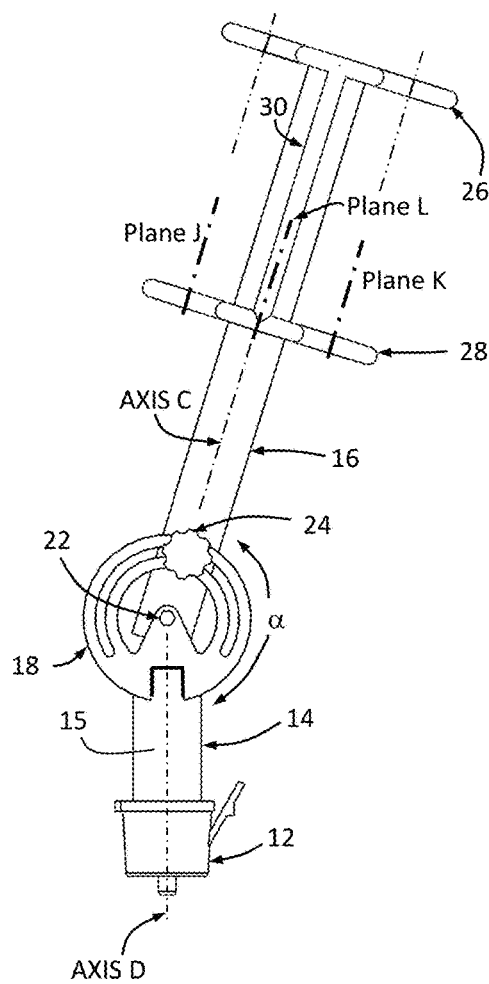
FIG. 5 depicts a side view of the rod holding device of FIG. 3 with tilted holder assembly at a discrete position within a range.

In this embodiment, holder assembly 25 is fixed to a distal end of pivot strut 16 using welds 154 (FIG. 6). Pivot strut 16 is pivotable through a range of motion thereby positioning rods 150 held within a holder assembly 25 in a plurality of angular positions. For example, FIG. 1 illustrates a generally upright orientation wherein a rod stored in holder assembly 25 would be held in a similar orientation. This generally upright orientation is useful while fishing. However, FIG. 3 illustrates a holder assembly 25 orientation that would be tilted toward one end of a boat such as the stern, whereas FIG. 4 illustrates a holder assembly 25 orientation that would be tilted toward an opposed end of a boat such as the bow. FIG. 5 illustrates a holder assembly positioned at a discreet position within a range thereby providing an adjustable angular relationship between Axis C of pivot strut 16 and Axis D of low strut 14.

Clamp shaft 80 of clamp assembly 24 travels within a clamp channel 42 of first range plate 18 and second range plate 20 wherein said clamp assembly 24 may be locked at any position within the clamp channel 42. In this embodiment, a pivot range of a pivot strut 16 is limited by interference between a portion of a clamp assembly 24 and one or more of a first stop surface 34 and a second stop surface 36 at terminal ends of a range plate clamp channel 42.

In this embodiment, clamp assembly 24 is locked by advancing one or more of a first clamp knob 76 and a second clamp knob 78 causing a frictional locking between the clamp assembly 24 and a corresponding range plate in a locked configuration. Clamp assembly 24 is unlocked by reversing advancement of one or more of a first clamp knob 76 and a second clamp knob 78 causing a reduction of frictional locking between clamp assembly 24 and a corresponding range plate in an unlocked configuration.

Adjusting the angulation of a holder assembly 25 comprises the steps of placing a fishing rod holding device 10 in an unlocked configuration and adjusting a corresponding pivot strut 16 to a new predetermined position, then changing the corresponding clamp assembly 24 to a locked configuration.

Figure 17:
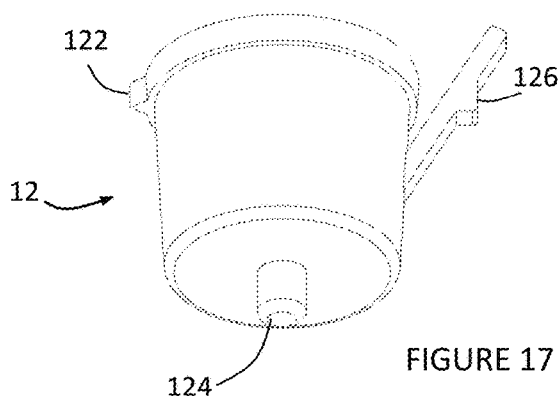
FIG. 17 depicts a low perspective view of a transition interface in the form of an interface cup.
Figure 18:
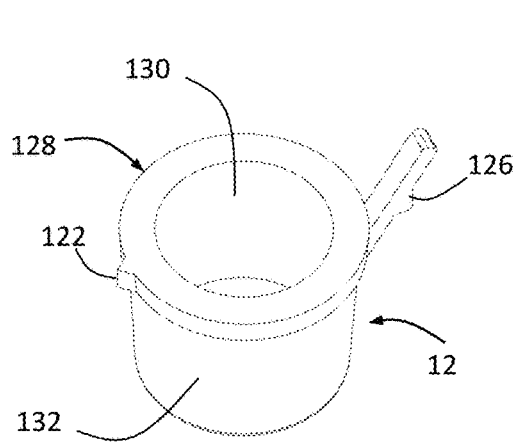
FIG. 18 depicts a high perspective view of the interface cup of FIG. 17.
Figure 18B:
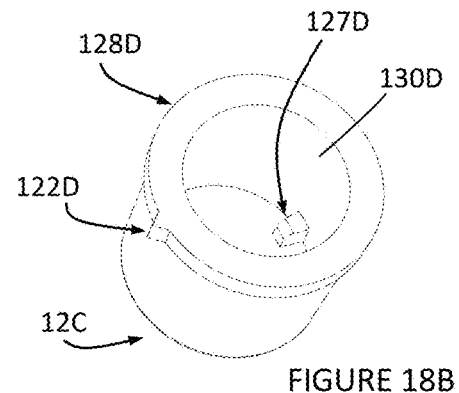
FIG. 18B depicts a depicts a high perspective view of a transition interface in the form of an interface cup having an optional positioning boss.
Figure 18C:
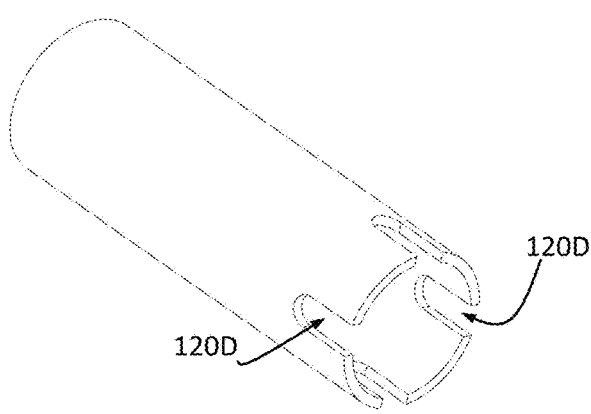
FIG. 18C depicts a high perspective view of a low strut having one or more radial notches.
Figure 18D:
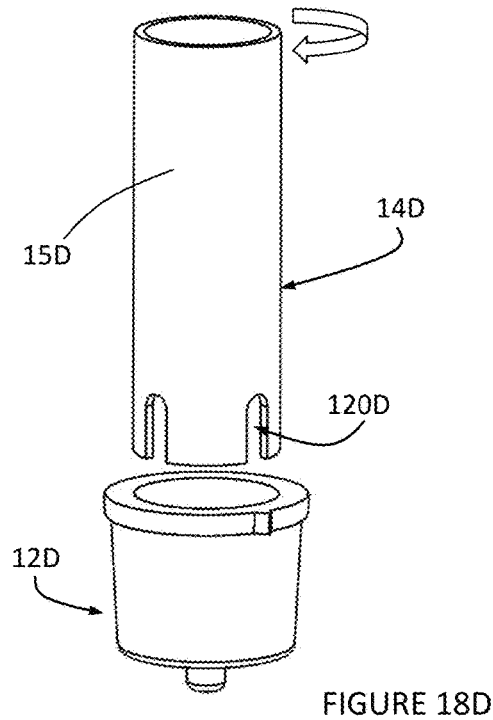
FIG. 18D depicts a perspective view of low strut of FIG. 18C aligned for entry into the transition interface in the form of the interface cup of FIG. 18B.
Figure 34B:
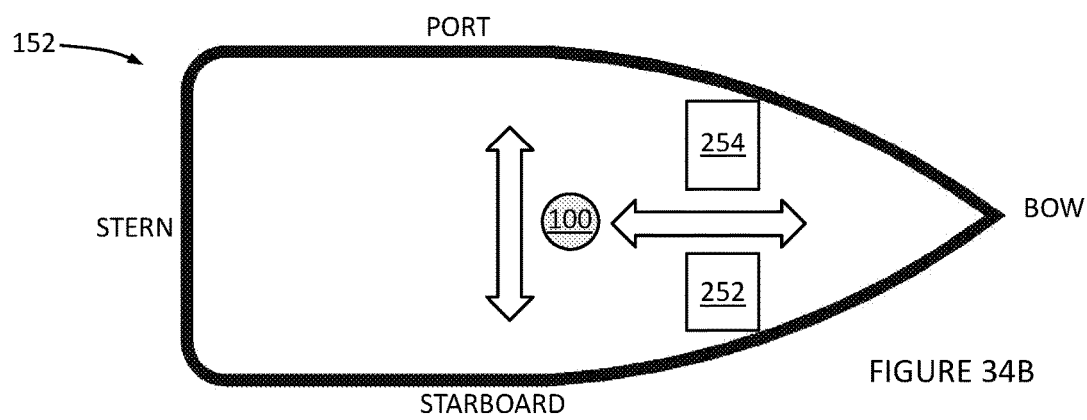
FIG. 34B is a top view of a diagram illustrating just a couple of the folding positions possible for the fishing rod holding device.

In one embodiment, low strut 14 is removably housed in a generally vertical orientation within a bore of an anchor device. A variety of coupling mechanisms utilized in the prior art that provide stationary holding of a low strut may be utilized. It is preferable that the coupling mechanism includes the ability to release and remove a rod holding device for storage purposes although the low strut may be permanently fixed in a predetermined position. FIG. 17-18 illustrate one style of coupling mechanism available from the prior art for utilization with the anchor 134 of FIG. 34. In this embodiment, fishing rod holding device 10 comprises a transition interface 12 at a proximal end of a low strut 14 as illustrated in FIG. 6. Here, transition interface 12 is in the form of an interface cup. Interface cup 128 comprises an inner cup face 130 having a size and profile for seating a proximal end of a low strut 14 therein. Interface cup 128 also comprises an outer cup face 132 having a size and profile suited for seating within anchor 134 (FIG. 34). Interface cup 128 comprises a high position boss 122 for seating within a complementing high notch 140 of anchor 134. Interface cup 128 also comprises a low position boss 124 for seating within a complementing low socket 142 of anchor 134, and a lever lock 126 for releasably securing an interface cup 128 within anchor 134. In FIG. 18B, an alternate embodiment of an interface cup 128D is illustrated wherein the lever lock is absent. A positioning boss 127D extends upwards from the bottom radial edge of the inner cup face 130D. FIG. 18D illustrates a complementary form of a low strut 14D for fit into the cavity formed by inner cup face 130D. In this embodiment, low strut 14D comprises one or more radial notches 120D extending upwards from an inferior end of the low strut 14D. When the low strut 14D is lowered into transition interface 12D as seen in FIG. 18D, positioning boss 127D occupies one of radial notches 120D thereby limiting rotation therebetween. Therefore, with a plurality of radial notches 120D such as illustrated in FIG. 18C, the rotational position of fishing rod holding device 10 with respect to the boat can be selected. For example, as illustrated in FIG. 34B, the fishing rod holding device can be configured to pivot from bow to stern (preferred when driving the boat to a fishing spot), or by simple lift and rotation of the low strut to a new radial notch, pivoted between starboard and port (preferred when transporting the boat on a trailer) or any other desired orientation. Note in FIG. 34B, the fishing rods held in the fishing rod holding device can be orientated such that the fishing rods are bundled in parallel orientation and lay down between a starboard windshield 252 and port windshield 254 thereby keeping the rods low and safe near the floor of the boat, yet bundled and out of the way of the boat operator driving the boat. This orientation is similar to that seen in FIG. 32 whereby the fishing rod holding device is shown pivoted downwards from an anchor 134 near the stern of the boat. In some embodiments, a positioning boss is absent from the interface cup. In this case, the fishing rod holding device is able to be freely pivoted in any direction desired by a user.

Further to these embodiments, anchor 134 comprises a base 136 portion comprising a cup holder 138 portion sized and shaped for seating a complementary transition interface 12 therein. Anchor 134 has a broad base 136 having screw holes at its periphery for securing to a base panel 148 (such as a floor or rail of a boat) using one or more base screws 146. In this embodiment, base panel 148 is the floor of a boat but may also be in the form of a horizontal surface elevated from the floor of a boat. When a fishing rod holding device 10 is removed from an anchor 134, the anchor 134 may be used to support a removable seat.

Figure 31:
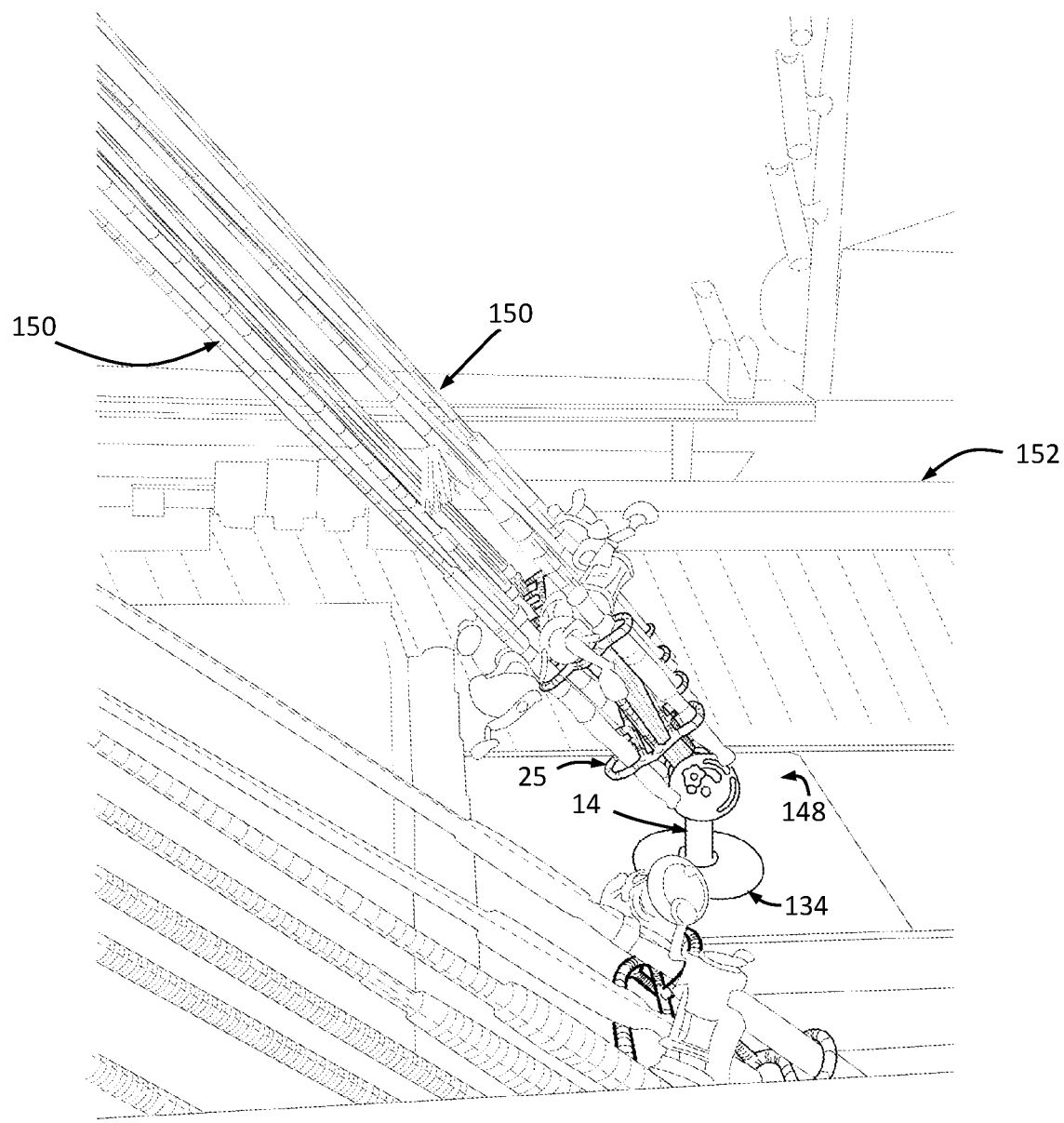
FIG. 31 is a partial perspective view of a rod holding device with a plurality of fishing rods seated within upper rod tunnels and lower rod tunnels of a holder assembly wherein the rod holding device is engaged with an anchor fixed to the floor of a boat and whereas the holder assembly is partially folded down in an operational configuration.
Figure 32:
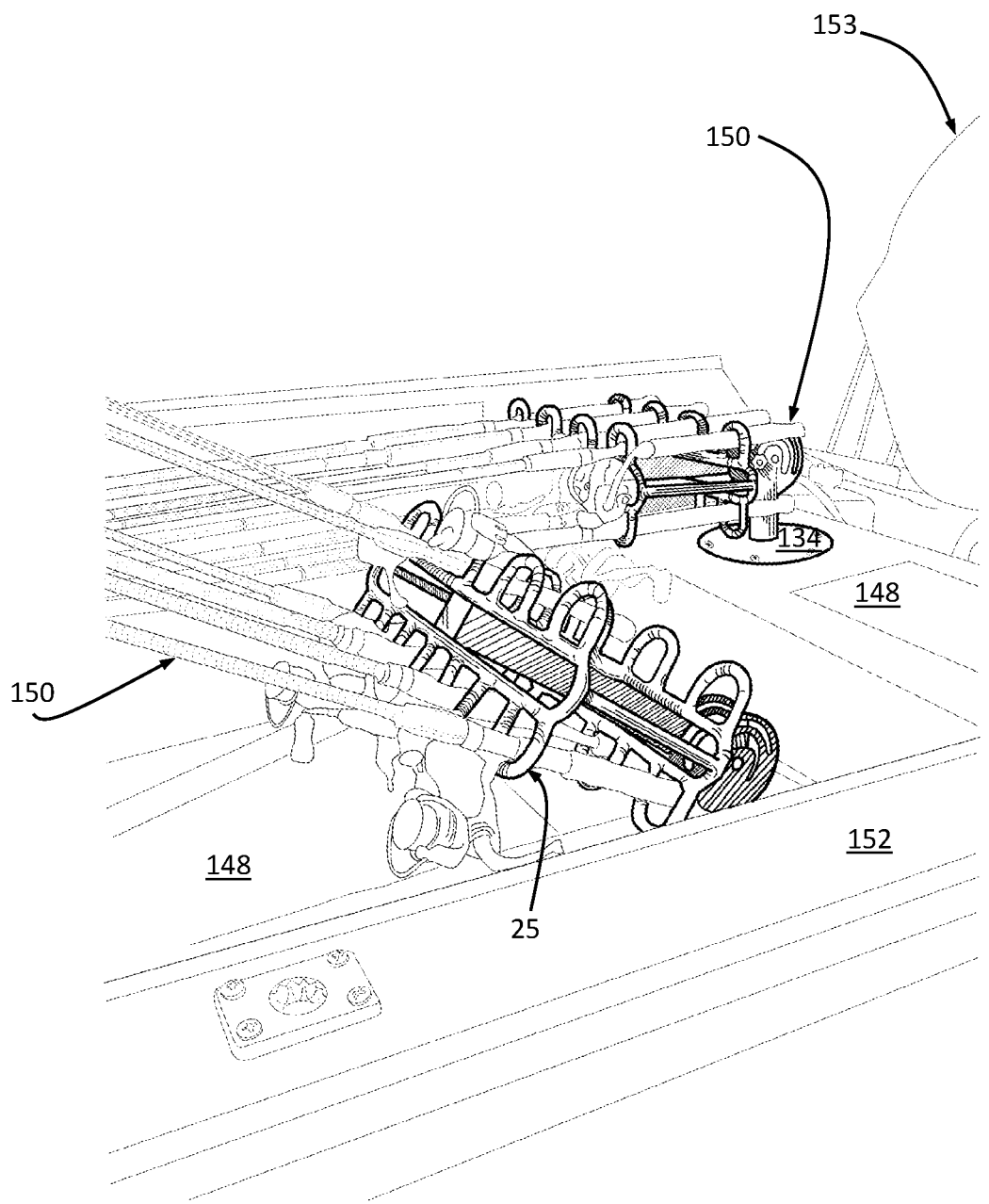
FIG. 32 is a partial perspective view of a rod holding device with a plurality of fishing rods seated within upper rod tunnels and lower rod tunnels of a holder assembly wherein the rod holding device is engaged with an anchor fixed to a bench at the stern of the boat and whereas the holder assembly is folded down in a transport configuration.
Figure 33:
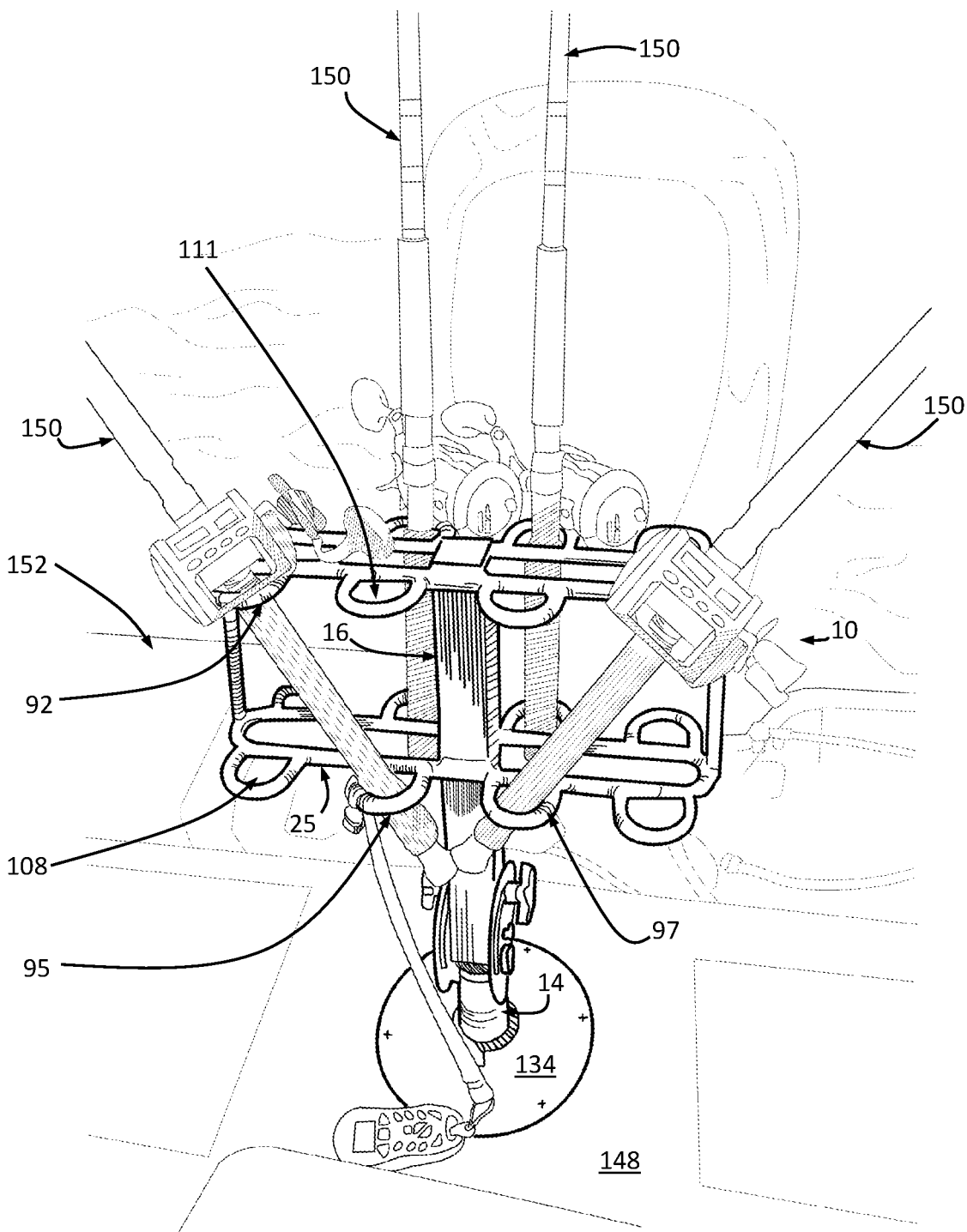
FIG. 33 is a partial perspective view of a rod holding device with a plurality of fishing rods seated within upper rod tunnels and lower rod tunnels of a holder assembly wherein the rod holding device is engaged with an anchor fixed to a bench at the stern of the boat and whereas the holder assembly is extended generally upright in an operational configuration.

Fishing rod holding device 10 in preferred embodiments holds a plurality of fishing poles 150 as illustrated in FIGS. 31-33. In addition, in some embodiments, fishing rod holding device 10 may be removed from an anchor for storage as illustrated in FIG. 33 by depressing lever lock and lifting then relocating fishing rod holding device 10 with any fishing rods 150 therein.

Figure 7:
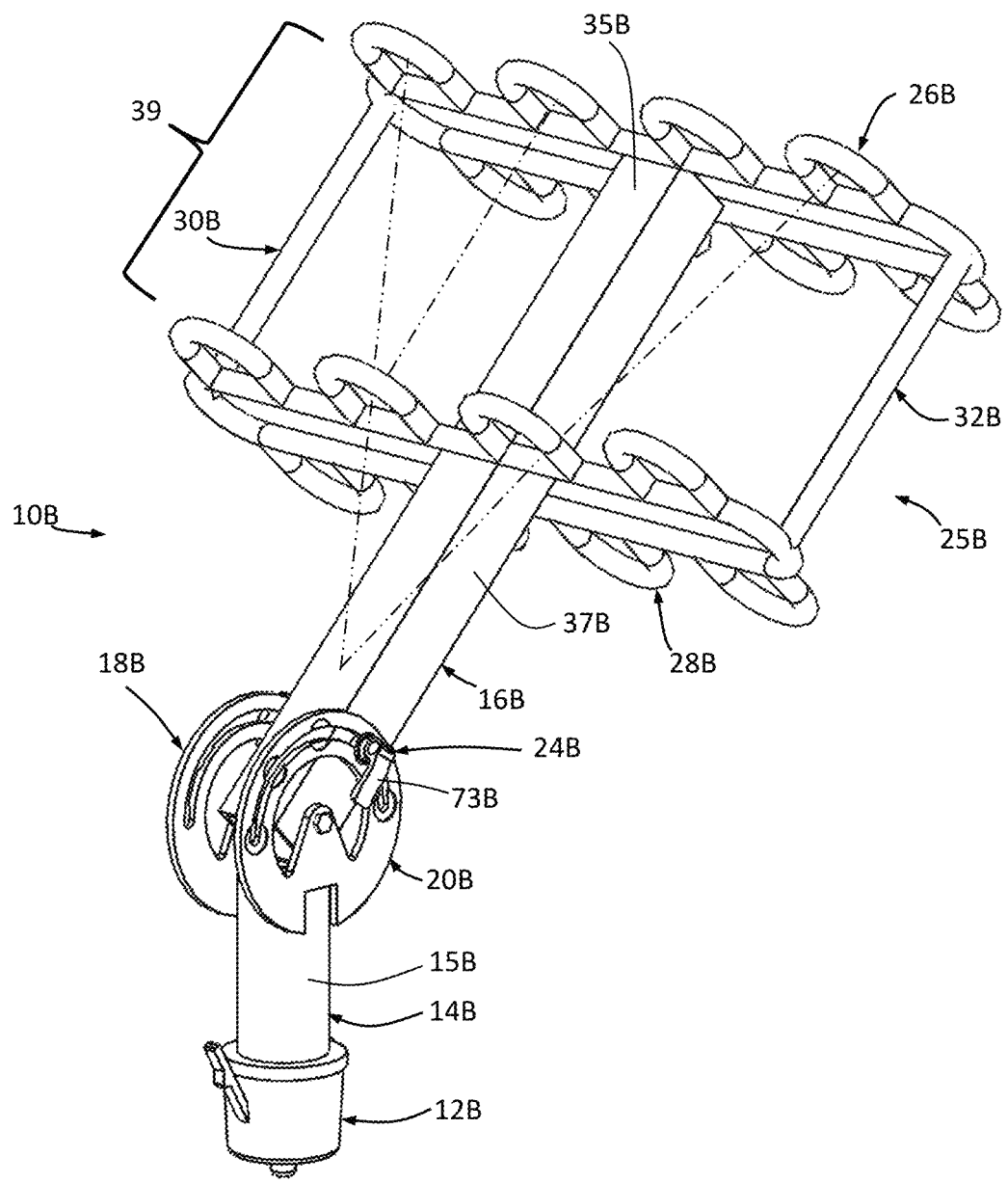
FIG. 7 depicts a perspective view of a rod holding device utilizing an alternative style of first range plate and second range plate.
Figure 12:
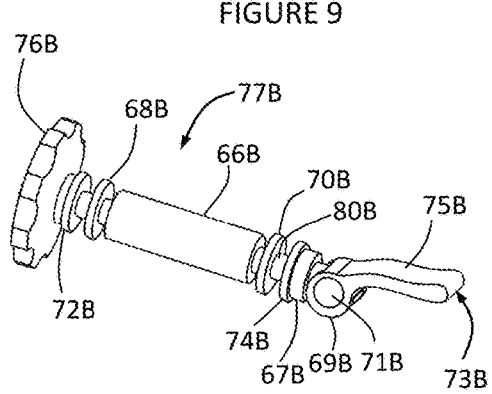
FIG. 12 depicts a perspective view of an alternative clamp assembly in the form of a cammed quick release rod and skewer in an unlocked configuration.
Figure 13:
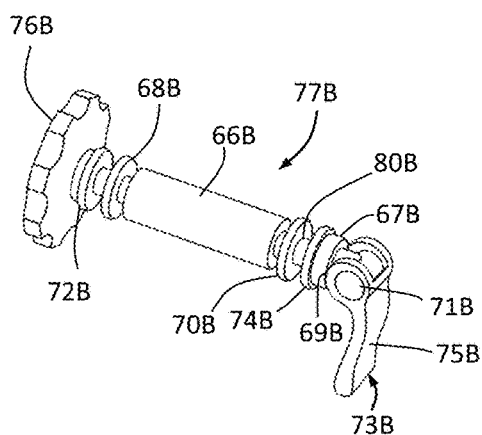
FIG. 13 depicts a perspective view of an alternative clamp assembly in the form of a cammed quick release rod and skewer in an locked configuration.

FIG. 7 illustrates another embodiment of a fishing rod holding device 10B comprising one or more range plates (first range plate 18B and second range plate 20B) having a plurality of lock pockets for locking of a holder assembly 25B in a variety of predetermined angular positions with respect to a low strut 14B. Here, a clamp assembly 24B is in the form of a cammed quick release rod and skewer 77B (FIG. 12, 13) which comprises a cam pad 67B on which a camlobe 69B from a cam lever 73B articulates. A cam shaft 71B is positioned generally perpendicular to a clamp shaft 80B of the cammed quick release rod and skewer 77B. The clamp assembly 24B is locked by pivoting cam lever 73B wherein camlobe 69B creates compression against cam pad 67B causing a frictional locking between the clamp assembly and corresponding range plate 18B, 20B in a locked configuration (FIG. 13). A clamp assembly is unlocked by reversing pivoting of a cam lever 73B causing a frictional loosening between the clamp assembly and corresponding range plate 18B, 20B in an unlocked configuration (FIG. 12). A cam handle 75B is disposed on cam lever 73B for gripping by a user. In some embodiments, range plate pairs are used in one of the following configurations; both range plates comprise lock pockets, only one range plate comprises lock pockets, and neither range plate comprises lock pockets.

In the embodiment of FIG. 7, one or more of a first range plate 18B and a second range plate 20B comprises a plurality of recess surfaces (first through fifth recess surfaces 158B, 160B, 162B, 164B, 166B) inset in an outer range face 17B. The recess surfaces are radially centered and spaced about a clamp channel 42B. A plurality of lock faces (first through fifth lock faces 159B, 161B, 163B, 165B, 167B) extend between the respective recess surfaces and corresponding outer range face 17B. A plurality of lock pockets (first through fifth lock pockets 168B, 169B, 170B, 171B, 172B) are formed in an outer range face 17B of a range plate and are defined by a corresponding recess surface and a lock face.

Each lock pocket is sized and shaped to seat a first or second outer clamp washer 72B, 74B (in alternative embodiments, cammed clamp assemblies may be used with lock pockets removed). In a locked configuration, a corresponding outer clamp washer abuts a lock face to prevent pivoting movement of a range plate from a predesignated position. In an unlocked configuration, an outer clamp washer is able to move past a lock face on the range plate to provide for pivoting adjustment of a holder assembly to a predesignated position.

FIGS. 19-30 illustrate yet another embodiment of a rod holding device 10C. In this embodiment, a clamp assembly 24C is in the form of a clamp shaft 80C that is biased in one direction. The clamp assembly 24C comprises an engagement knob 222C mounted on one end of clamp shaft 80C by for example threads, pins, clips, compression, or other means known in the art. An engagement spring 212C is seated over clamp shaft 80C adjacent clamp head 81C for biasing the clamp shaft 80C in one direction. A washer 214C may be placed against the spring base. An engagement knob 222C comprises a radially positioned engagement face 220C sized to engage a lock pocket (i.e. ninth lock pocket 176C) on first range plate 18C.

In this embodiment, engagement knob 222C comprises at least one grasp face 242C for grasping by a user's hand to distract clamp assembly. In addition, engagement knob 222C comprises a stop face 218C for abutting with outer range face 17C of range plate 18C. First engagement threads 216C on clamp shaft 80C engage with second engagement threads 217C of engagement knob 222C. Distracting engagement knob 222C against engagement spring 212C force unlocks engagement face 220C from a lock pocket thereby providing consequent angle adjustment of pivot strut 16C relative to low strut 14C. Once a new angle adjustment is chosen, engagement knob 222C is released causing consequent engagement of engagement face 220C in an alternative lock pocket. During this angular adjustment, clamp shaft 80C is pivotable through clamp channel 42C for adjustment of a pivot strut angle α (between Axis C and D).

As noted in FIG. 27, first range plate 18C comprises a series of first through ninth lock faces (i.e. respectively 159C, 161C, 163C, 165C, 167C, 177C, 178C, 179C, 181C) forming first through ninth lock pockets (i.e. respectively 168C, 169C, 170C, 171C, 172C, 173C, 174C, 175C, 176C) along the length of clamp channel 42C which is defined by channel face 44C. As illustrated, the lock faces are sized and shaped to seat an engagement face 220C of engagement knob 222C therein. Force from engagement spring 212C causes stop face 218C to remain adjacent to outer range face 17C until disengaged by the user. First range plate 18C and second range plate 20C (absent of lock pockets along a clamp channel) are positionally aligned as illustrated in FIGS. 29 and 30.

In this embodiment (FIG. 19-25), low strut 14C terminates in a releasable foot 186C which is configured for releasable fixation to anchor plate 189C. The releasable foot 186C comprises a foot plate 188C fixed to low strut 14C. In some embodiments, one or more welds join the low strut 14C to the foot plate 188C. In other embodiments, a base strut 180C reinforces the junction between low strut 14C and foot plate 188C. As illustrated, the base strut 180C is in the form of a tube and resides within low strut 14C.

In this embodiment, low strut 14C comprises at least one weld notch 195C at an inferior end that joins low strut 14C with base strut 180C using a weld 194C. Base strut 180C, having a base face 182C at an inferior end and radial face 184C, is seated in ring aperture 192C. Ring aperture 192C is defined by ring wall 190C and extends through foot plate 188C between a foot bottom 204C and foot top 206C. A weld 194C secures base face 182C to ring wall 190C as illustrated in FIG. 25. Foot plate 188C comprises an opposing first slot 198C (defined by first slot face 196C) and second slot 202C (defined by second slot face 200C) extending between a foot bottom 204C and foot top 206C from a foot end face 205C of foot plate 188C. Foot plate 188C also comprises opposing foot side faces 207C.

As illustrated, anchor plate 189C is configured for releasable locking with a foot plate 188C. An upper lock aperture 208C for housing a lock bolt 210C extends from a foot top 206C to a foot bottom 204C of foot plate 188C. Anchor plate 189C comprises opposed anchor end surfaces 248C and opposed anchor side surfaces 250C. In addition, anchor plate 189C comprises opposed first plate holes 230C and opposed second plate holes 232C extending between an anchor top surface 244C and anchor bottom surface 246C at opposed ends of the anchor plate 189C. In this embodiment, at least one of the first plate holes 230C and second plate holes 232C are counter sunk or counter bored for seating of the head of a plate fastener therein.

Further to this embodiment, lock collar 228C is configured for seating within one or more of first slot 198C and second slot 202C of foot plate 188C to provide releasable fixation at one end of the foot plate 188C. The lock collar 228C comprises a toe wall 236C sized to fit within one or more of a first slot 198C and second slot 202C of foot plate 188C. A bottom collar face 241C seat against an anchor top surface 244C. A radially enlarged rim 234C is spaced from the bottom collar face 241C for seating of foot plate 188C therebetween. The radially enlarged rim 234C comprises a rim face 239C for engaging the foot top 206C of a foot plate 188C when the lock collar 228C is seated within a first slot 198C or second slot 202C. In addition, lock collar 228C comprises a collar aperture 240C extending through lock collar 228C along a central axis. A countersunk or counter bored head recess 238C provides seating the head of a plate fastener therein.

As illustrated in FIG. 22, anchor plate 189C comprises a lower lock aperture 209C extending between anchor top surface 244C and anchor bottom surface 246C of anchor plate 189C. In this embodiment, lower lock aperture 209C is threaded to complement lock bolt 210C. Upper lock aperture 208C and lower lock aperture 209C are aligned when releasable foot 186C is mated with the anchor plate 189C. First foot plate fastener 224C extends through collar aperture 240C of a lock collar 228C and through a first plate hole 230C of anchor plate 189C then seated in a base panel of a boat. In this embodiment, second foot plate fastener 226C extends through a second plate hole 232C of an anchor plate 189C and is then seated in a base panel 148C of a boat. The head of second foot plate fastener 226C is seated in a counter sunk or counter bored portion of a second plate hole 232C.

FIG. 31 illustrates one embodiment of a fishing rod holding device with one or more fishing rods 150 seated within an upper rod tunnel and lower rod tunnel of a holder assembly 25. Here, holder assembly 25 is shown angled towards the bow of the boat. FIG. 32 illustrates another embodiment of a pair of fishing rod holding devices 10 with one secured to an anchor 134 fixed to a base panel 148 on the floor of a boat and the other fixed to an anchor 134 fixed to a base panel 148 elevated from the floor of a boat 152 in front of boat motor 153. The low angled position not only makes transport of rods tidy and convenient, it also angles fishing rods 150 such that they clear overhead obstacles such as garage door headers. In addition, the feature to lower fishing rods 150 adds convenience of neatly storing fishing rods in a boat while not obstructing the use of a boat cover.

FIG. 33 illustrates yet another embodiment of a fishing rod holding device 10 seated in an anchor 134 fixed to an elevated base panel 148 of a boat 152. In this embodiment, some of the fishing rods 150 are held in aligned upper and lower rod tunnels 106, 108 of corresponding cages whereas other fishing rods are angled outwards by insertion into rod tunnels that are misaligned.

FIG. 34 illustrates one style of anchor 134 known in the prior art secured to a base panel 148 of a boat 152 by the use of base screws 146. A cup holder 138 is sized and shaped to receive a transition interface 12 of the variety illustrated in FIGS. 17-18 and utilized in the rod holding device of FIG. 7 and other embodiments. As illustrated in FIG. 33, cup holder 138 seats transition interface 12 therein thus holding low strut 14 generally vertical in an operational configuration. Anchor 134 comprises high notch 140, low socket 142, and lever notch 144 to complement respective features high position boss 122, low position boss 124, and lever lock 126 of transition interface 12 for seating therein.

Figure 35:
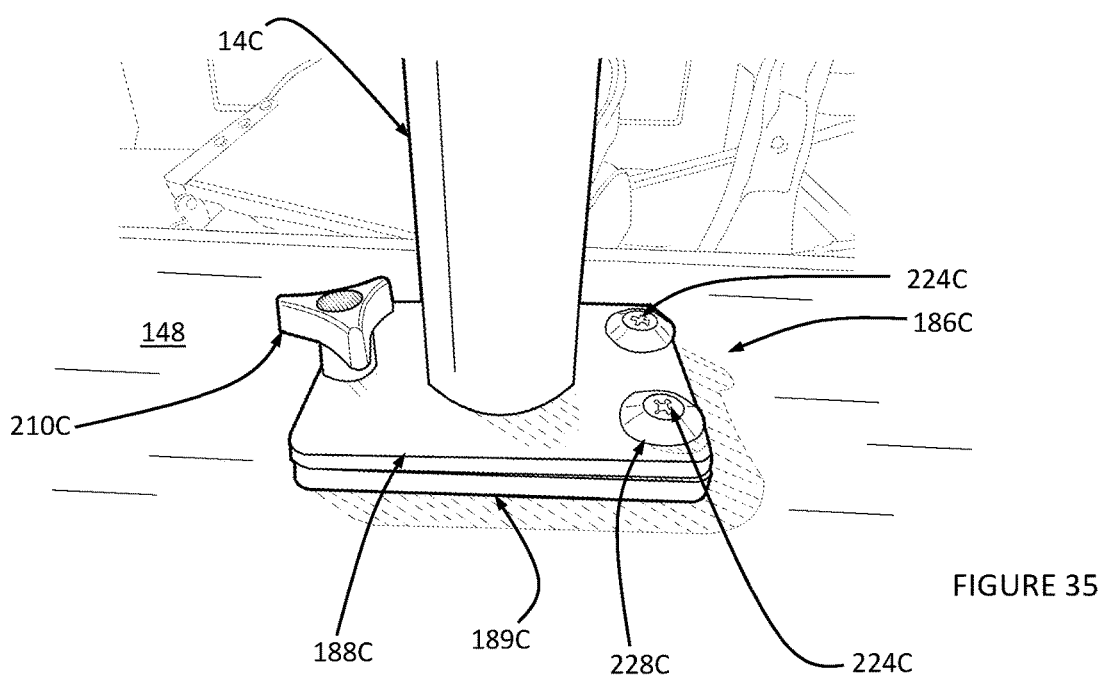
FIG. 35 is a perspective view of a releasable foot and anchor plate system of FIG. 19 whereas the anchor plate is mounted to the rail of a fishing boat in an operational configuration.

FIG. 35 illustrates one embodiment of a releasable foot 186C locked into an anchor plate 189C that is fixed to a base panel 148 of a boat. Each lock collar 228C is seated in a respective first slot 198C and a second slot 202C of foot plate 188C. Lock bolt 210C extends through foot plate 188C and securing into anchor plate 189C.

Figure 36:
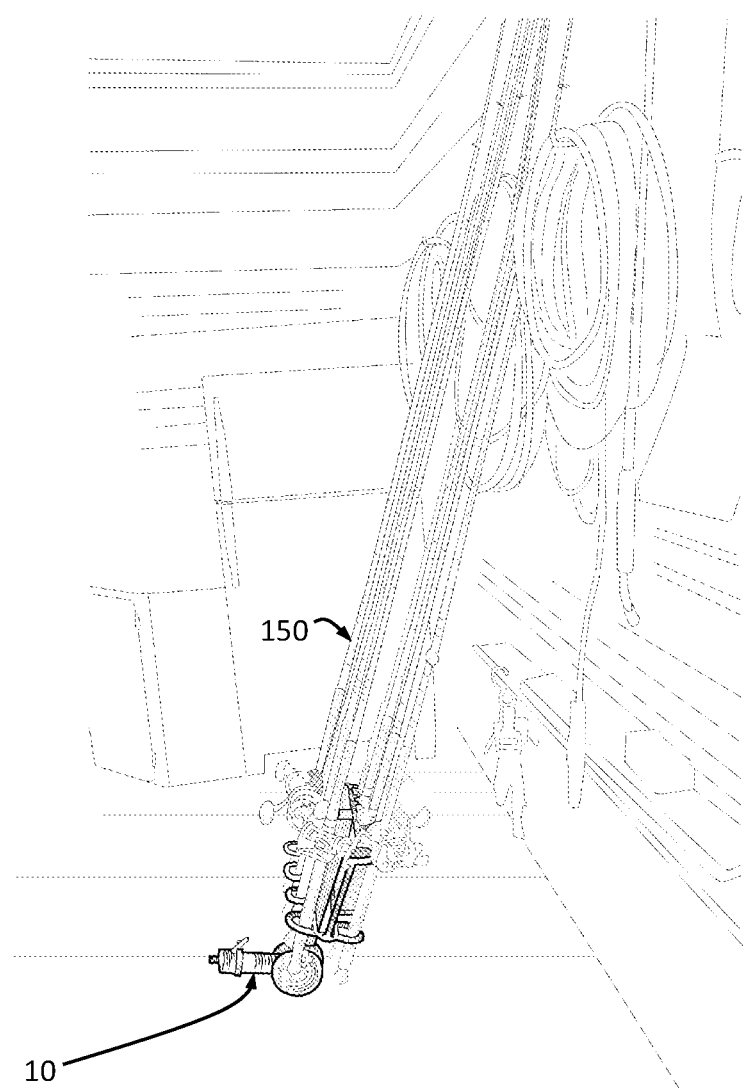
FIG. 36 is a perspective view of a rod holding device with fishing rod held therein, removed from its anchor for storage at a separate location in a storage configuration.

FIG. 36 illustrates an embodiment of a fishing rod holding device 10 released from its anchor 134 in a storage configuration and here resting against the wall of a garage.

Figure 37:
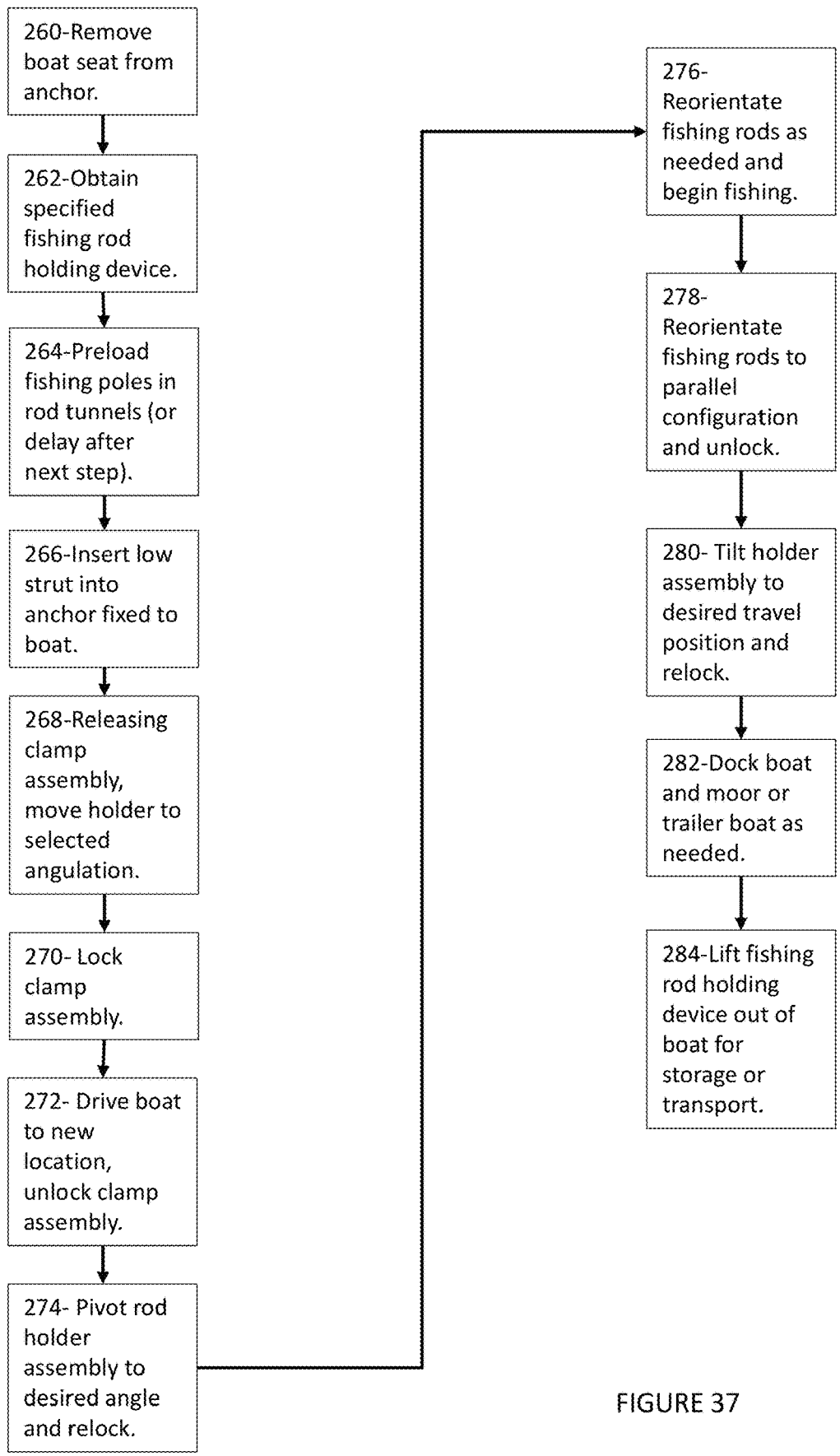
FIG. 37 is a flow chart depicting a method of using a fishing rod holding device.

FIG. 37 illustrates steps in a method of utilizing a fishing rod holding device to hold and transport fishing rods in and out of a boat. The method begins by obtaining a boat and removing, if necessary, a boat seat from a cup holder in an anchor device secured to a base panel such as a floor of a boat (if necessary) (260). Obtaining a fishing rod holding device as described herein having a substantially vertical elongate low strut (in an operational configuration) coupled to an elongate pivot strut on which a rod holding assembly is secured and whereby the pivot strut is selectively pivotable relative to the low strut (262). Preloading fishing poles (or delay after next step) in rod tunnels in the rod holding assembly preferably in parallel orientation to the pivot strut (264). Aligning the low strut with a cup holder in an anchor secured to a base panel of a boat and lowering the low strut for seating within the cup holder (266). An interface cup can be included therebetween. Releasing a clamp assembly to an unlocked configuration and moving the holder assembly to a selected degree of pivot which can encompass tilting the pivot strut such that the fishing poles are fully upright or reclined at a desired angle such as for example, that the fishing poles are laying down against the floor (such as between the starboard and port windshield), or adjacent sides of the boat in a bundle (268). Placing the clamp assembly in a locked configuration (270). Driving the boat to a desired location activating the clamp assembly to an unlocked configuration (272) and pivoting the holder assembly to a desired angulation for fishing. Activating the clamp assembly to a locked configuration (274). Reorientating the fishing rods as desired to a parallel configuration or a splayed configuration or mixed configuration (276). When completing the fishing experience, reorientating the rods to a parallel configuration and activating the clamp assembly to an unlocked configuration (278). Tilting the holding assembly to a desired position during boat travel and activating the clamp assembly to a locked configuration (280). Docking the boat and trailering if so desired (282). Lifting the fishing rod holding device upwards to remove it from the cup holder in the boat if so desired and storing it in a vehicle or other storage location (284). The fishing poles can remain in the fishing rod holding device during storage if so desired.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A rod holding device comprising:
an elongate low strut;
an elongate pivot strut;
a first range plate;
a second range plate;
said first range plate spaced from said second range plate;
said first range plate fixed to a superior end of said low strut;
said second range plate fixed to a superior end of said low strut;
said low strut positioned between said first range plate and said second range plate;
a pivot aperture;
said pivot aperture extending through said first range plate and said second range plate along an axis;
a pivot hole;
said pivot hole extending through opposing sides of said pivot strut at an inferior end;
said pivot hole on said pivot strut aligned with said pivot apertures of said first range plate and said second range plate;
a clamp hole;
said clamp hole extending through said pivot strut spaced superiorly and generally parallel to said pivot aperture;
said first range plate and said second range plate having an inner range face and outer range face;
an arced clamp channel extending between said inner range face and said outer range face of said first range plate and said second range plate;
wherein said arced clamped channel in said first range plate is aligned with said arced clamped channel of said second range plate;
said pivot strut positioned between said first range plate and said second range plate;
a pivot assembly;
said pivot assembly seated in said pivot aperture of said first range plate and said second range plate and said pivot hole of said pivot strut and is operable to control pivoting of said pivot strut with respect to said low strut;
a clamp assembly;
said clamp assembly disposed in said clamp channel of said first range plate and said second range plate and said clamp hole of said pivot strut;
a holder assembly operable to hold rods therein;
said holder assembly comprising a planar upper rod holder spaced from a lower rod holder;
said upper rod holder comprising a substantially obround upper rod collar having an obround shaped central aperture;
said upper rod holder comprising a plurality of upper cages extending outward from said upper rod collar;
said lower rod holder comprising a substantially obround lower rod collar having an obround shaped central aperture;
said lower rod holder comprising a plurality of lower cages extending outward from said lower rod collar;
wherein said pivot strut extends through and is fixed within said central aperture of said upper rod collar and said lower rod collar;
whereas said upper rod holder and said lower rod holder are spaced along and orientated perpendicular to said pivot strut; and
wherein an inferior end of said low strut stands generally vertical in an operational configuration.

2. The rod holding device of claim 1 whereby aligned said upper cages and lower cages define a plurality of rod tunnels extending between said upper rod holder and said lower rod holder; and whereby said rod tunnels are aligned in opposing planes spaced on each side of said pivot strut.

3. The rod holding device of claim 1 whereby at least one of said upper cages and at least one of said lower cages are U-shaped.

4. The rod holding device of claim 1 whereby ends of U-shaped said upper cage and said lower cage are welded to a respective said upper rod collar and lower rod collar.

5. The rod holding device of claim 1 whereby each said upper cage is aligned along an axis with said lower cage thereby defining a rod tunnel extending between said aligned upper cage and said lower cage; and
whereby said axes extending between said paired upper cage and said lower cage is parallel to said pivot strut.

6. The rod holding device of claim 1 whereby a cage gap defines spacing between adjacent said upper cages and between adjacent lower cages.

7. The rod holding device of claim 1 further comprising:
an engagement spring;
an engagement knob;
wherein said engagement spring biases said engagement knob toward said first range plate;
an engagement face;
a stop face;
said engagement face encircling a portion of said engagement knob about a central engagement knob axis;
wherein the diameter of said engagement face is larger than said clamp channel;
a plurality of lock pockets;
said plurality of lock pockets spaced along said clamp channel;
said plurality of lock pockets sized for seating said engagement face therein and extending through said first range plate;
wherein said engagement face is housed within one of said lock pockets therein fixing said angular position between said pivot strut and said lower strut.

8. The rod holding device according to claim 1 wherein each of said upper rod holder and said lower rod holder have eight cages.

9. The rod holding device according to claim 1 further comprising:
a first holder stabilizer;
a second holder stabilizer;
wherein said first holder stabilizer and said second holder stabilizer extend substantially parallel to said pivot strut from short sides of the upper rod collar to short sides on the lower rod collar.

10. A rod holding device comprising:
an elongate low strut;
an elongate pivot strut;
a clamp assembly;
said pivot strut pivotably coupled to said low strut and lockable at variable pivot positions utilizing said clamp assembly;
a holder assembly operable to hold rods therein;
said holder assembly comprising a planar upper rod holder spaced from a lower rod holder;
said upper rod holder comprising a substantially obround upper rod collar having an obround shaped central aperture;

said upper rod holder comprising a plurality of upper cages extending outward from said upper rod collar;

said lower rod holder comprising a substantially obround lower rod collar having an obround shaped central aperture;

said lower rod holder comprising a plurality of lower cages extending outward from said lower rod collar;

wherein said pivot strut extends through and is fixed within said central aperture of said upper rod collar and said lower rod collar;

whereas said upper rod holder and said lower rod holder are spaced along and orientated perpendicular to said pivot strut; and wherein an inferior end of said low strut stands generally vertical in an operational configuration.

11. The rod holding device of claim 10 whereby at least one of said upper cages and at least one of said lower cages are U-shaped.

12. The rod holding device of claim 11 whereby ends of U-shaped said upper cages and said lower cages are welded to a respective said upper rod collar and lower rod collar.

13. The rod holding device of claim 10 whereby each said upper cage is aligned along an axis with a said lower cage thereby defining a rod tunnel extending between said aligned upper cage and said lower cage; and whereby said axes extending between respective said upper cages and said lower cages are parallel to said pivot strut.

14. The rod holding device of claim 10 whereby said upper rod collars and said lower rod collars are aligned in the same plane as their respective said upper cages and said lower cages.

15. The rod holding device of claim 10 whereby a cage gap defines spacing between adjacent said upper cages and between adjacent said lower cages.

16. The rod holding device of claim 10 whereby rods can be seated in rod tunnels in any one of a parallel configuration, a diagonal configuration, and a mixed configuration.

\* \* \* \* \*